US009441628B2

(12) United States Patent
Sakata et al.

(10) Patent No.: US 9,441,628 B2
(45) Date of Patent: Sep. 13, 2016

(54) ELECTRIC PUMP UNIT

(75) Inventors: Takatoshi Sakata, Yamatotakada (JP); Akihiko Kawano, Kashiwara (JP); Takeo Iino, Hashimoto (JP); Naohito Yoshida, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 998 days.

(21) Appl. No.: 13/388,592

(22) PCT Filed: Aug. 4, 2010

(86) PCT No.: PCT/JP2010/063147
§ 371 (c)(1),
(2), (4) Date: Feb. 2, 2012

(87) PCT Pub. No.: WO2011/016467
PCT Pub. Date: Feb. 10, 2011

(65) Prior Publication Data
US 2012/0128513 A1    May 24, 2012

(30) Foreign Application Priority Data

| Aug. 4, 2009 | (JP) | 2009-181319 |
| Aug. 4, 2009 | (JP) | 2009-181325 |
| Aug. 4, 2009 | (JP) | 2009-181327 |
| Aug. 5, 2009 | (JP) | 2009-182057 |
| Aug. 5, 2009 | (JP) | 2009-182060 |
| Aug. 5, 2009 | (JP) | 2009-182062 |
| Feb. 19, 2010 | (JP) | 2010-034222 |
| Feb. 19, 2010 | (JP) | 2010-034224 |

(51) Int. Cl.
*F04C 2/10* (2006.01)
*F04C 2/08* (2006.01)
(Continued)

(52) U.S. Cl.
CPC .............. *F04C 2/086* (2013.01); *F04C 2/102* (2013.01); *F04C 11/008* (2013.01);
(Continued)

(58) Field of Classification Search
CPC .......... F04C 2/10; F04C 2/102; F04C 2/086; F04C 11/008; F04C 15/008; F04C 15/0096; F04C 29/04; F04C 29/045; F04C 2240/40; F16H 57/0434; F16H 57/436; F16H 57/441; F16H 61/0025
USPC .......................... 417/410.3, 410.4; 418/206.8
See application file for complete search history.

(56) References Cited

U.S. PATENT DOCUMENTS 6,004,119 A    12/1999  Hamasaki et al.
6,075,304 A *   6/2000  Nakatsuka ............. 310/216.137
(Continued)

FOREIGN PATENT DOCUMENTS

| CA | 2210621 A1 | 1/1998 |
| CN | 1385639 A  | 12/2002 |

(Continued)

OTHER PUBLICATIONS

Jun. 11, 2013 Office Action issued in Japanese Application No. 2009-181319 (with translation).
(Continued)

*Primary Examiner* — Charles Freay
*Assistant Examiner* — Philip Stimpert
(74) *Attorney, Agent, or Firm* — Oliff PLC

(57) ABSTRACT

An electric pump unit for a transmission, which supplies a hydraulic pressure to the transmission, includes: a pump which takes in and discharges oil; and a pump driving electric motor including a motor shaft connected to the pump, a motor rotor fixedly provided on the motor shaft, and a motor stator disposed around a circumference of the motor rotor. The pump and the electric motor are integrated with a lid that tightly closes an opening in a recess portion which is formed on a transmission housing of the transmission and into which the oil is introduced, and are accommodated within the recess portion.

9 Claims, 14 Drawing Sheets

(51) Int. Cl.
  *F04C 11/00* (2006.01)
  *F04C 15/00* (2006.01)
  *F16H 57/04* (2010.01)
  *F16H 61/00* (2006.01)

(52) U.S. Cl.
  CPC ........ *F04C 15/008* (2013.01); *F04C 15/0096* (2013.01); *F04C 2240/30* (2013.01); *F04C 2240/40* (2013.01); *F16H 57/0434* (2013.01); *F16H 61/0025* (2013.01)

(56) References Cited

U.S. PATENT DOCUMENTS

| | | | |
|---|---|---|---|
| 2002/0098940 A1 | 7/2002 | Minowa et al. | |
| 2003/0070879 A1* | 4/2003 | Pringle et al. | 184/6.28 |
| 2003/0104902 A1 | 6/2003 | Minowa et al. | |
| 2008/0308355 A1* | 12/2008 | Kakinami | F16H 57/04 184/27.2 |
| 2009/0114181 A1 | 5/2009 | Okabe | |
| 2010/0239450 A1 | 9/2010 | Rosenkranz | |
| 2012/0128513 A1 | 5/2012 | Sakata et al. | |

FOREIGN PATENT DOCUMENTS

| | | |
|---|---|---|
| JP | U-62-29488 | 2/1987 |
| JP | A-09-019091 | 1/1997 |
| JP | A-11-013650 | 1/1999 |
| JP | A-2000-087868 | 3/2000 |
| JP | A-2000-289472 | 10/2000 |
| JP | A-2003-278670 | 10/2003 |
| JP | A-2005-337025 | 12/2005 |
| JP | A-2008-014242 | 1/2008 |
| JP | A-2008-132941 | 6/2008 |
| JP | 2008-215088 | 9/2008 |
| JP | A-2008-263757 | 10/2008 |
| JP | A-2009-002200 | 1/2009 |
| JP | A-2009-225501 | 10/2009 |
| JP | A-2011-32979 | 2/2011 |
| WO | 2009/036723 A1 | 3/2009 |

OTHER PUBLICATIONS

Office Action issued in Japanese Patent Application No. 2010-034224 mailed Dec. 10, 2013 (with translation).
Office Action issued in Chinese Application No. 201080034800.5 dated Feb. 27, 2014 (with translation).
Nov. 16, 2010 International Search Report issued in International Application No. PCT/JP2010/063147 (with translation).
Feb. 6, 2015 Search Report issued in European Patent Application No. 10806466.8.

* cited by examiner

ELECTRIC PUMP UNIT

TECHNICAL FIELD

The present invention relates to an electric pump unit which is used as a hydraulic pump for supplying a hydraulic pressure to a transmission (a gearbox) of a motor vehicle, for example.

BACKGROUND ART

Although a hydraulic pressure is supplied to a transmission of a motor vehicle by a hydraulic pump, in a motor vehicle which performs so-called idle reduction which shuts down an engine when the motor vehicle stops from the viewpoint of saving energy, an electrically operated hydraulic pump is used to ensure the supply of a hydraulic pressure to the transmission even during performing the idle reduction.

An electrically operated hydraulic pump for a transmission of a motor vehicle is installed in a limited space in a vehicle body. Therefore, there is a need for an electrically operated hydraulic pump to reduce the size thereof and also to reduce the weight and production costs thereof. With a view to meeting these requirements, an electric pump unit is proposed, in which a pump, a pump driving electric motor and a controller for the electric motor is incorporated in a common unit housing (refer to Patent Document 1, for example).

RELATED ART DOCUMENTS

Patent Documents

Patent Document 1: JP-A-2008-215088

SUMMARY OF THE INVENTION

The electric pump unit described in the background art described above is fixed to an outside of a transmission with screws and is connected to the transmission by means of piping.

Consequently, the unit housing is waterproofed by a seal. In addition, seals are also required in an interior of the unit housing for waterproofing electric equipment such as the electric motor and the controller therefor.

The invention has been made in view of the above-described circumstances, and an object thereof is to provide an electric pump unit for a transmission which requires no waterproofed housing for an electrically operated hydraulic pump and which can reduce the size of a portion of the electric pump unit where the electrically operated hydraulic pump is provided and also reduce the weight and costs.

According to an aspect of the invention, an electric pump unit for a transmission, which supplies a hydraulic pressure to the transmission, includes: a pump which takes in and discharges oil; and a pump driving electric motor including a motor shaft connected to the pump, a motor rotor fixedly provided on the motor shaft, and a motor stator disposed around a circumference of the motor rotor, and the pump and the electric motor are integrated with a lid that tightly closes an opening in a recess portion which is formed on a transmission housing of the transmission and into which the oil is introduced, and are accommodated within the recess portion.

With the electric pump unit for a transmission, waterproofed housing for an electrically operated hydraulic pump is unnecessary, and the size of a portion of the electric pump unit where the electrically operated hydraulic pump is provided can be reduced, and also the weight and costs can be reduced.

MODE FOR CARRYING OUT THE INVENTION

Hereinafter, embodiments of the invention will be described by reference to the drawings.

FIGS. 1 to 4 depict a first embodiment.

Figure 1:
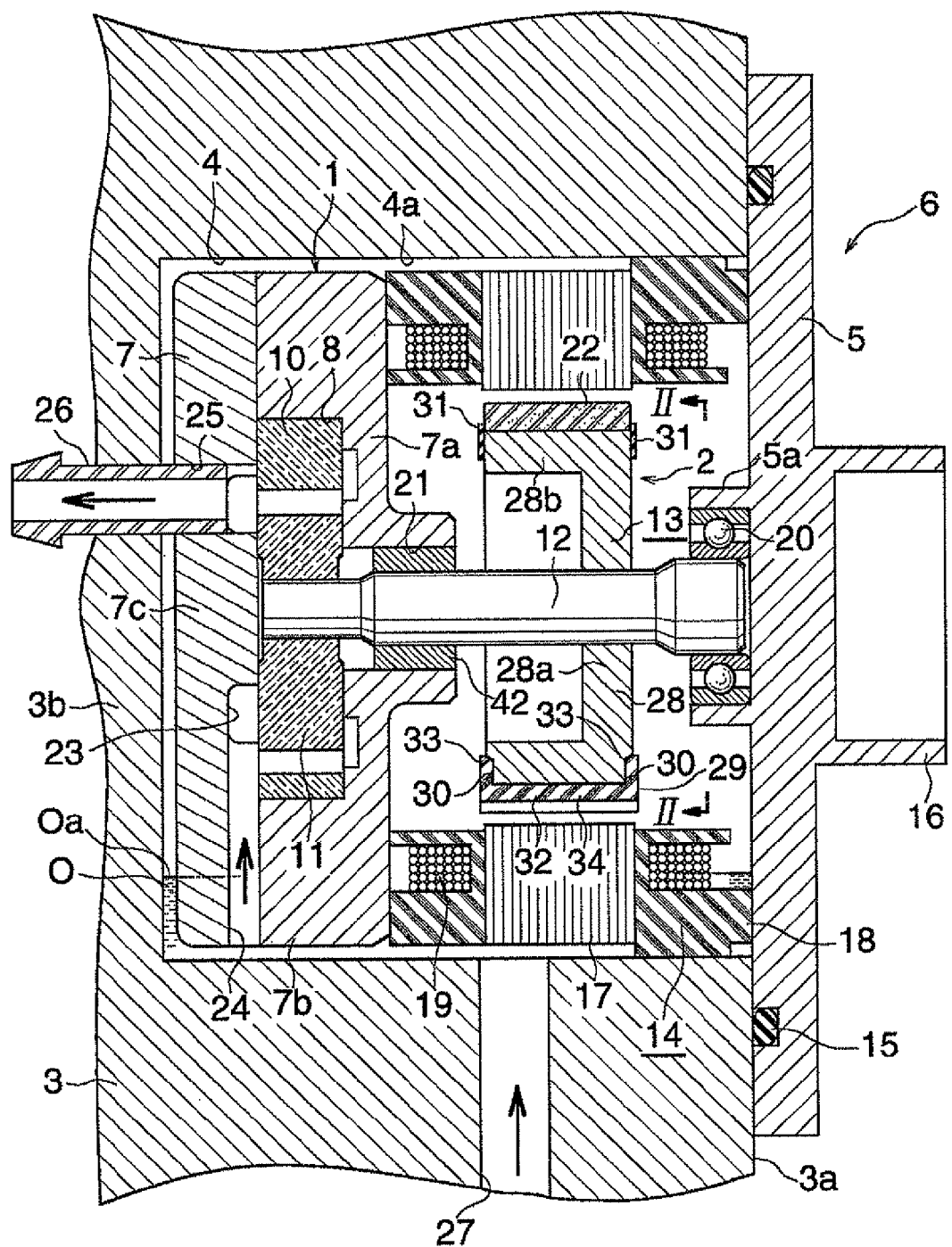
FIG. 1 is a vertical sectional view of a main part of an electric pump unit for a transmission which depicts a first embodiment of the invention.

FIG. 1 is a vertical sectional view showing a portion of an electric pump unit (6) for a transmission of a motor vehicle for idle reduction, the portion incorporating a pump (1) and a pump driving electric motor (2). In the following description, a left-hand side of FIG. 1 is referred to a front and a right-hand side as a rear of the electric pump unit (6).

The electric pump unit (6) for a transmission according to the embodiment is such as to be used to compensate, in an auxiliary fashion, for a hydraulic pressure in a transmission of a motor vehicle which decreases when idle reduction is performed. The electric pump unit (6) is, as FIG. 1 shows, disposed within a recess portion (4), which is a bottomed circular hole opened at a rear thereof, formed in a rear surface (an outer surface) of a vertical wall (3a) which is perpendicular and which constitutes a transmission housing (3) for the transmission of the motor vehicle. The pump (1)

and the motor (2) are integrated with a lid (5), and the electric pump unit (6) for a transmission is made up of these constituent components. The motor (2) is disposed in front of the lid (5), and the pump (1) is disposed in front of the motor (2). The pump (1) and the motor (2) are fitted in the recess portion (4), and the lid (5) tightly closes a rear opening of the recess portion (4). In this embodiment, the pump (1) is an internal gear pump, and the motor (2) is a DC brushless motor having three-phase windings.

The pump (1) includes a pump housing (7) having a short cylindrical shape. An outer gear (an outer rotor) (10) is rotatably accommodated within a pump compartment (8) which is defined within the pump housing (7). An inner gear (an inner rotor) (11), which meshes with the outer gear (10), is disposed inside the outer gear (10).

The motor (2) includes a horizontally disposed pump driving motor shaft (12), a motor rotor (13) which is fixed to a rear portion of the motor shaft (12), and a motor stator (14) which is disposed around a circumference of the motor rotor (13).

The lid (5) has a circular disk shape and is fixed to the rear surface of the vertical wall (3a) around a circumference of the recess portion (4) via an O-ring (15) with appropriate means such as bolts, not shown. A diametrically small, short cylindrical portion (5a) which is concentric with the recess portion (4) is formed integrally at a central portion of a front surface (an inner surface) of the lid (5), and a connector (16) is formed on a rear surface (an outer surface) of the lid (5).

The stator (14) is configured such that an insulator (a synthetic resin insulation member) (18) is incorporated in a core (17) including laminated steel plates and a coil (19) is wound around a portion of the insulator (18). A rear end face of the insulator (18) is fixed to the front surface of the lid (5) by an appropriate means such as bonding. A part of the stator (14) contacts a circumferential wall (4a) of the recess portion (4). Although the illustration thereof is omitted, the coil (19) is connected to the connector (16). A rear end face of the pump housing (7) is fixed to a front end face of the insulator (18) by an appropriate means such as bonding. The rear end portion of the motor shaft (12) is rotatably supported in a bearing unit (20) provided within the diametrically small, short cylindrical portion (5a) of the lid (5). In this embodiment, the bearing unit (20) is made up of a single ball bearing which is one of rolling bearings. Note that the bearing unit (20) is not limited to the ball bearing, and hence, a roller bearing or a needle bearing may be used as the bearing unit (20). In addition, the bearing unit (20) is not limited to the rolling bearing, and hence, various types of bearing units including slide bearings may be used as the bearing unit (20). A front portion of the motor shaft (12) passes through a portion of a rear wall (7a) of the pump housing (7) where a hole (21) is formed to enter the pump compartment (8), and a front end portion of the motor shaft (12) is connected to the inner gear (11) of the pump (1). A bush (42) is interposed between the motor shaft (12) and a circumferential wall of the hole (21), and no seal is provided in that portion. The bush (42) is fitted in the hole (21), and an inner circumferential surface of the bush (42) and an outer circumferential surface of the motor shaft (12) slide on each other, whereby a slide bearing is configured thereat. The rotor (13) is formed into a cylindrical structure which extends radially outwards from a rear portion of the motor shaft (12) and surrounds the motor shaft (12) inside the stator (14). Permanent magnets (22) are provided around an outer circumference of the rotor (13).

A gap is provided between an outer circumferential surface of the pump housing (7) and the circumferential wall (4a) of the recess portion (4). An oil inlet hole (24), which is continuous with an arc-shaped oil inlet port (23) of the pump compartment (8), is provided in a lower portion of a circumferential wall (7b) of the pump housing (7). An oil outlet port (25) is formed in an appropriate location on a front wall (7c) of the pump housing (7), and an oil outlet pipe (26) is connected to the oil outlet port (25). The outlet pipe (26) penetrates a bottom wall (a front wall) (3b) of the recess portion (4) in the transmission housing (3) and is connected to a required portion of the transmission or is connected to the required location of the transmission via another pipe, although the illustration thereof is omitted.

An oil inlet hole (27), which communicates with an oil pan, not shown, is formed in a lower portion of the circumferential wall (4a) of the recess portion (4) in the housing vertical wall (3a), so that oil (O) enters an interior of the recess portion (4) by way of this hole (27). In addition, at least a part of the pump (1) and the motor (2) is soaked in the oil (O). In this embodiment, a lower portion of the stator (14) is soaked in the oil (O).

Figure 2:
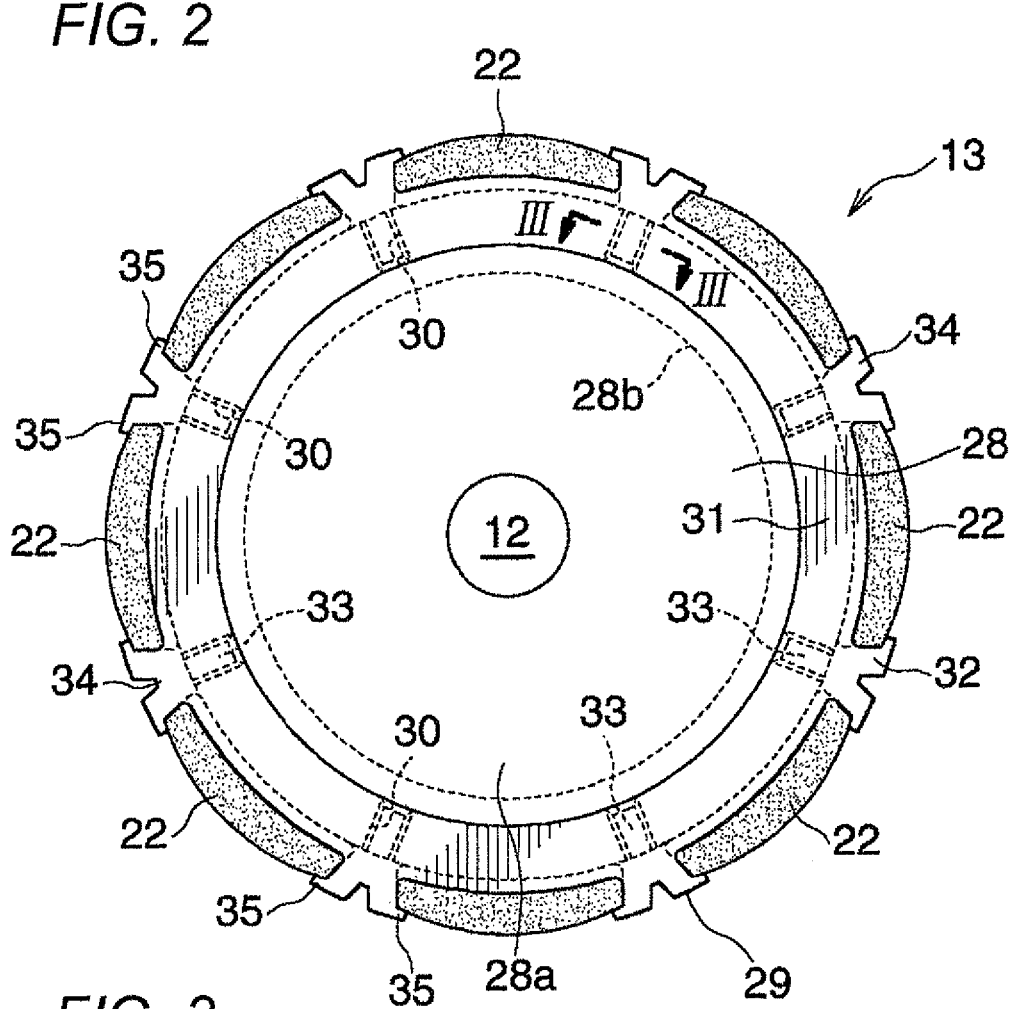
FIG. 2 is an enlarged arrow diagram taken along the line II-II in FIG. 1.
Figure 3:
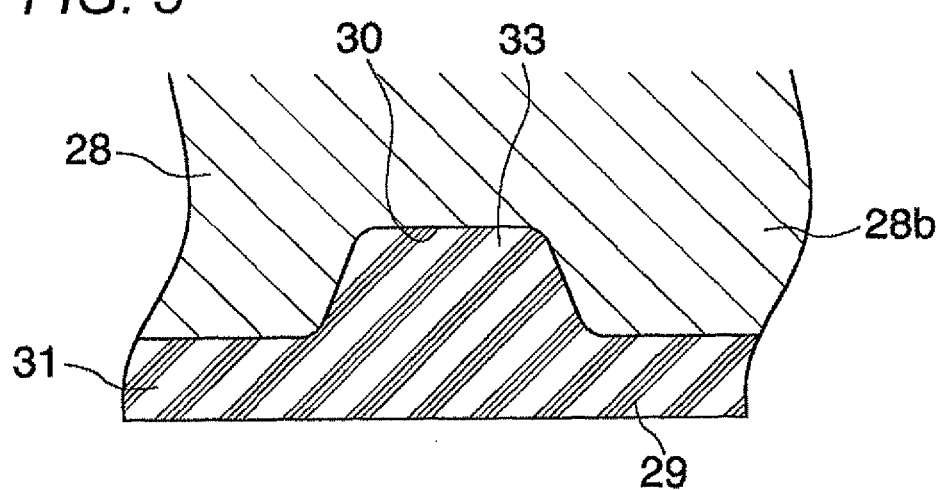
FIG. 3 is an enlarged sectional view taken along the line III-III in FIG. 2.
Figure 4:
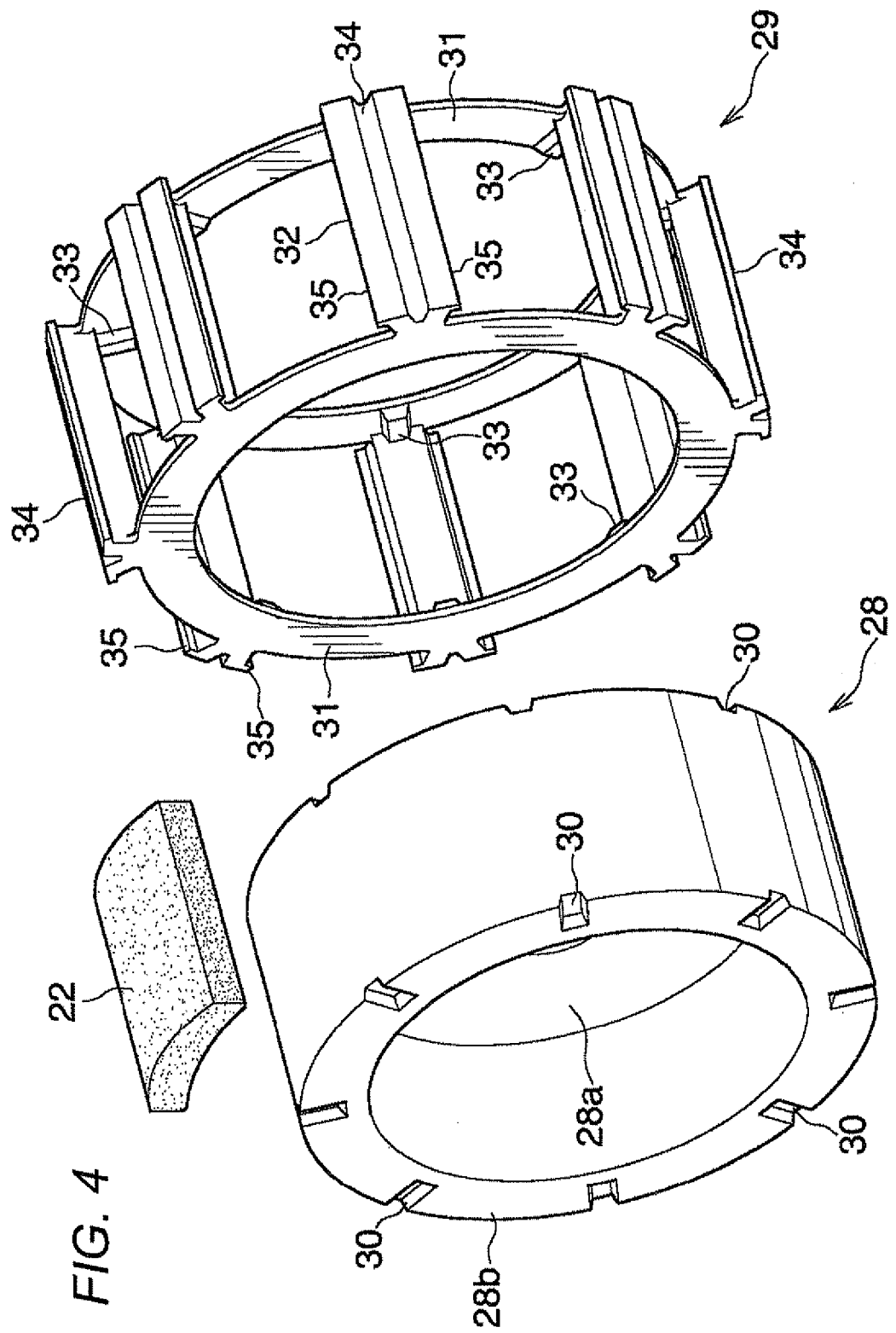
FIG. 4 is an imaginary exploded perspective view of a motor rotor shown in FIG. 1.

FIGS. 2 to 4 show the details of the rotor (13). FIG. 2 is an enlarged arrow diagram taken along the line II-II in FIG. 1, FIG. 3 is an enlarged sectional view taken along the line III-III in FIG. 2, and FIG. 4 is an imaginary exploded perspective view of the rotor (13).

The rotor (13) is such that a synthetic resin permanent magnet holding member (29) is fixedly provided on an outer circumference of a cylindrical rotor main body (back yoke) (28) and segmental permanent magnets (22) are held in plural (in this embodiment, eight) locations on the holding member (29) which are separated equally along a circumferential direction of the holding member (29).

The rotor main body (28) is formed through sintering, for example, and includes a flange portion (28a) which is fixed to the motor shaft (12) and a cylindrical portion (28b) which is formed integrally along an outer circumferential end of the flange portion (28a) so as to extend to the front in such a way as to surround the motor shaft (12). The whole of an outer circumferential surface of the cylindrical portion (28b) is formed into a cylindrical surface and a cross section of the outer circumferential surface has a circular shape. Detent recesses (30) are formed in plural (eight in this embodiment) locations which are separated equally in a circumferential direction at outer circumferential portions at both end portions of the cylindrical portion (28b). In this embodiment, the recesses (30) are formed at outermost circumferential portions of both end faces of the cylindrical portion (28b) as notches which extend from the outer circumferential portions of the end faces to end portions of the outer circumferential surface of the cylindrical portion (28b).

The holding member (29) is integrated with the cylindrical portion (28b) by being molded on to the outer circumferential portion of the cylindrical portion (28b) from a synthetic resin. The holding member (29) includes annular portions (31) which are closely attached to the outer circumferential portions of both the end faces of the cylindrical portion (28b) and connecting portions (32) which connect together both the annular portions (31) and hold the permanent magnets (22) on the outer circumferential surface of the cylindrical portion (28b). Plural detent projections (33), which are adapted to fit in the corresponding recesses (30) on the cylindrical portion (28b), are formed integrally on sides of both the annular portions (31) which face each other. The connecting portions (32) each include plural rod-shaped portions (34) which extend in an axial direction to connect together both the annular portions (31). The rod-shaped portions (34) are formed in plural (eight in this embodiment)

locations which are separated equally along a circumferential direction of the annular portions (31) and in the same circumferential positions as those of the projections (33). The rod-shaped portions (34) extend further radially outwards than the annular portions (31) and have a cross section with a V shape. Permanent magnet holding claw portions (35) are formed integrally at both distal end portions of the V shape so as to project to both circumferential sides. Then, the permanent magnets (22) are inserted from the axial direction between the claw portions (35) of the adjacent rod-shaped portions (34) to be held therebetween.

The holding member (29) is molded integrally on the rotor main body (28) and hence, both the members are never separated. However, in the exploded perspective view in FIG. 4, the two members are shown as being separated from each other for the purpose of easily understanding the configurations thereof.

The detent recesses which are formed on the cylindrical portion (28b) of the rotor main body (28) do not have to be the recesses (30) which are notched from the end face to the outer circumferential surface of the cylindrical portion (28b) but may be bottomed holes which are formed in plural locations on either of the end face or the circumferential surface of the cylindrical portion (28b) or in plural locations on both. As this occurs, the detent projections on the holding member (29) are provided in positions which correspond to the recesses which are bottomed holes. In the case of the rotor main body being a sintered structure, it is difficult to form holes therein, and therefore, the aforesaid notched recesses (30) are preferable.

The controller (not shown) of the motor (2) is disposed outside the transmission and is connected to the motor (2) via the connector (16) on the lid (5).

The motor (2) stops while the vehicle is running, and hence, the pump (1) also stops.

While the vehicle is stopping, the motor (2) operates, whereby the pump (1) also operates. When the pump (1) starts operating, the oil (O) within the recess portion (4) is taken in from the inlet hole (24), is then discharged into the outlet pipe (26) from the oil outlet port (25) and is eventually supplied to the required locations in the transmissions by way of the outlet pipe (26).

In the electric pump unit (6) for a transmission, the pump (1) and the pump driving electric motor (2) are provided in the interior of the transmission housing (3), and therefore, the unit housing of the conventional electric pump unit is not necessary. Consequently, the waterproofing of the unit housing is also not necessary. The controller of the electric motor (2) is not provided in the interior of the transmission housing (3), and therefore, the waterproofing thereof is also not necessary. In addition, no seal is required between the pump (1) and the electric motor (2). Consequently, it is possible to provide the electric pump unit (6) which is compact in size and low in weight and costs. In addition, the electric pump unit (6) operates while the vehicle is stopping, and therefore, the control of an oil level (Oa) of the hydraulic oil (O) can be implemented only by controlling the amount of the hydraulic oil (O).

In the motor rotor (13), although it is considered that the permanent magnets (22) are fixed to the rotor main body (28) with an adhesive, when an adhesive is used in an environment where oil is poured on to the permanent magnets (22), there are fears that the permanent magnets (22) are separated. In the embodiment, the plural permanent magnets (22) are held by the synthetic resin permanent magnet holding member (29) which is fixedly provided on the outer circumferential portion of the cylindrical rotor main body (28). Therefore, the permanent magnets (22) do not have to be fixed to the rotor main body (28) with an adhesive, and hence, there are no fears that the permanent magnets (22) are separated from the rotor main body (28).

Further, the detent projections (33) on the permanent magnet holding member (29) are fitted in the detent recesses (30) on the rotor main body (28), and therefore, although the whole of the outer circumferential surface of the rotor main body (28) is formed into the cylindrical surface and the outer circumferential surface has the circular cross-sectional shape, the permanent magnet holding member (29) never slides relative to the rotor main body (28) in the circumferential direction during rotation, whereby the permanent magnet holding member (29) is fixed in place in an ensured fashion. In addition, since the outer circumferential surface of the rotor main body (28) is the cylindrical surface, it can be worked easily and fabricated inexpensively.

However, the configurations of the rotor main body (28) and the holding member (29) are not limited those described in this embodiment and hence can be altered as required.

A part of the motor stator (14) is in contact with the transmission housing (3) having a large heat capacity, and therefore, heat generated in the stator (14) is dissipated with good efficiency. Further, heat generated in the stator (14) is dissipated from the portion of the stator (14) which is soaked in the oil (O) through the oil (O). Because of this, the size of the electric pump unit (6) does not have to be enlarged for heat dissipation, and therefore, the portion of the electric pump unit (6) where the electric pump resides can be made compact in size, and the weight and costs thereof can be decreased.

In the embodiment described above, the oil (O) is introduced into the lower portion of the recess portion (4) and the lower portion of the stator (14) of the motor (2) is soaked in the oil (O). However, a configuration may be adopted in which oil is introduced into the whole of the recess portion (4) and the whole of the motor (2) is soaked in the oil.

Figure 5:
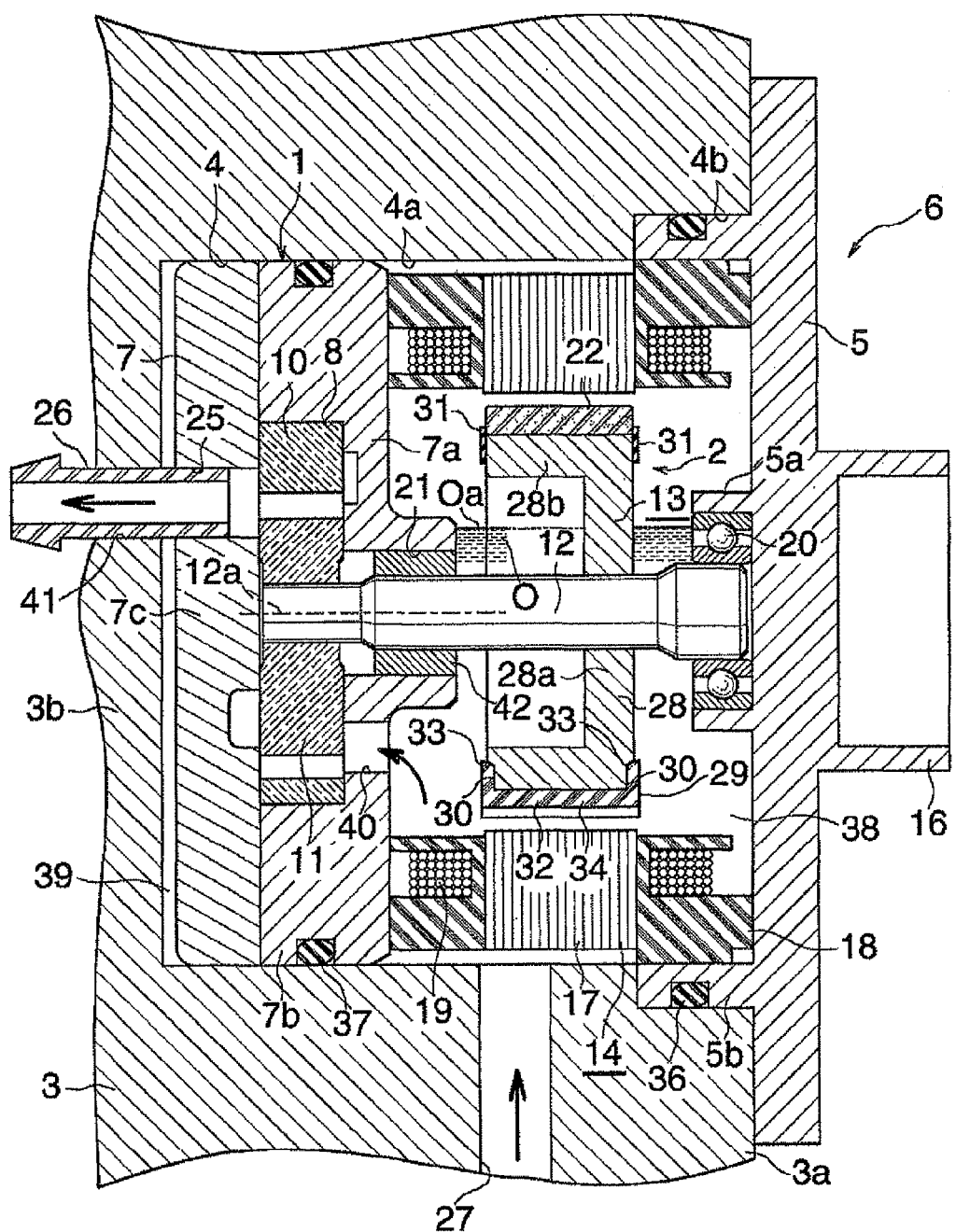
FIG. 5 is a vertical sectional view of a main part of an electric pump unit for a transmission which depicts a second embodiment of the invention.

FIG. 5 is a drawing corresponding to FIG. 1 which depicts a second embodiment. In FIG. 5, like reference numerals will be given to like portions to those shown in FIG. 1.

In the case of the second embodiment, a circumferential wall (4a) is removed at a rear end portion of a recess portion (4) so that a diametrically expanded portion (4b) is formed. A diametrically large, short cylindrical portion (5b), which is larger in diameter than a diametrically small, short cylindrical portion (5a), is formed concentrically with the diametrically small, short cylindrical portion (5a) on a front surface of a lid (5). The diametrically large, short cylindrical portion (5b) fits in the diametrically expanded portion (4b) of the recess portion (4), so that an inner circumferential surface of the short cylindrical portion (5b) constitutes an extension of the circumferential wall (4a) of the recess portion (4). An O-ring (36) is provided between an outer circumference of the short cylindrical portion (5b) and an inner circumference of the diametrically expanded portion (4b). A gap is formed between an outer circumference of a stator (14) and the circumferential wall (4a) of the recess portion (4), and a diametrically expanded portion at a rear portion of an insulator (18) is in contact with an inner circumference of the diametrically large, short cylindrical portion (5b) of the lid (5).

A pump housing (7) fits almost closely in the recess portion (4), and an O-ring (37) is disposed between an outer circumference of the pump housing (7) and the circumferential wall (4a) of the recess portion (4) for sealing. An interior of the recess portion (4) is divided into a relatively large waterproofed opening side space (38) including the motor (2) which is defined on a rear side of the pump housing (7) and a relatively small bottom side space (39) which is defined on a front side of the pump housing (7) by the two O-rings (36, 37).

An oil inlet hole (27) is formed so as to face a lower portion of the opening side space (38), so that oil (O) is introduced into the opening side space (38) up to an upper portion than a center (12a) of a motor shaft (12). An arc-shaped oil inlet port (40) extends to the rear so as to penetrate a rear wall (7a) of the pump housing (7) to thereby communicate with an external portion at a portion on the rear wall (7a) which lies lower than an oil level (Oa), that is, at a lower portion of the rear wall (7a) in this embodiment. Because of this, no oil inlet hole has to be machined separately from the oil inlet port (40).

When a pump (1) operates, the oil (O) in the opening side space (38) is taken in from the oil inlet port (40), is then discharged into an outlet pipe (26) from an oil outlet port (25) and is eventually supplied to required locations in a transmission by way of the outlet pipe (26).

A portion of the opening side space (38) lying lower than the center (12a) of the motor shaft (12) is soaked in the oil (O), and hence, a ball bearing of a bearing unit (20) which supports the motor shaft (12) is soaked in the oil (O) to thereby be lubricated with the oil (O). Because of this, neither grease for lubrication nor a seal needs to be provided in or on the ball bearing.

In this embodiment, the oil outlet pipe (26) fitted in an oil outlet hole (41) formed in a bottom wall (3b) of a transmission housing (3) is connected to the oil outlet port (25). However, the bottom side space (39) is separated from the opening side space (38) which is situated on an oil inlet side, and therefore, a configuration may be adopted in which the oil is discharged from the oil outlet port (25) by way of the bottom side space (39) and the oil outlet hole (41) without using the oil outlet pipe (26).

The other features of the second embodiment are similar to those of the first embodiment.

Figure 6:
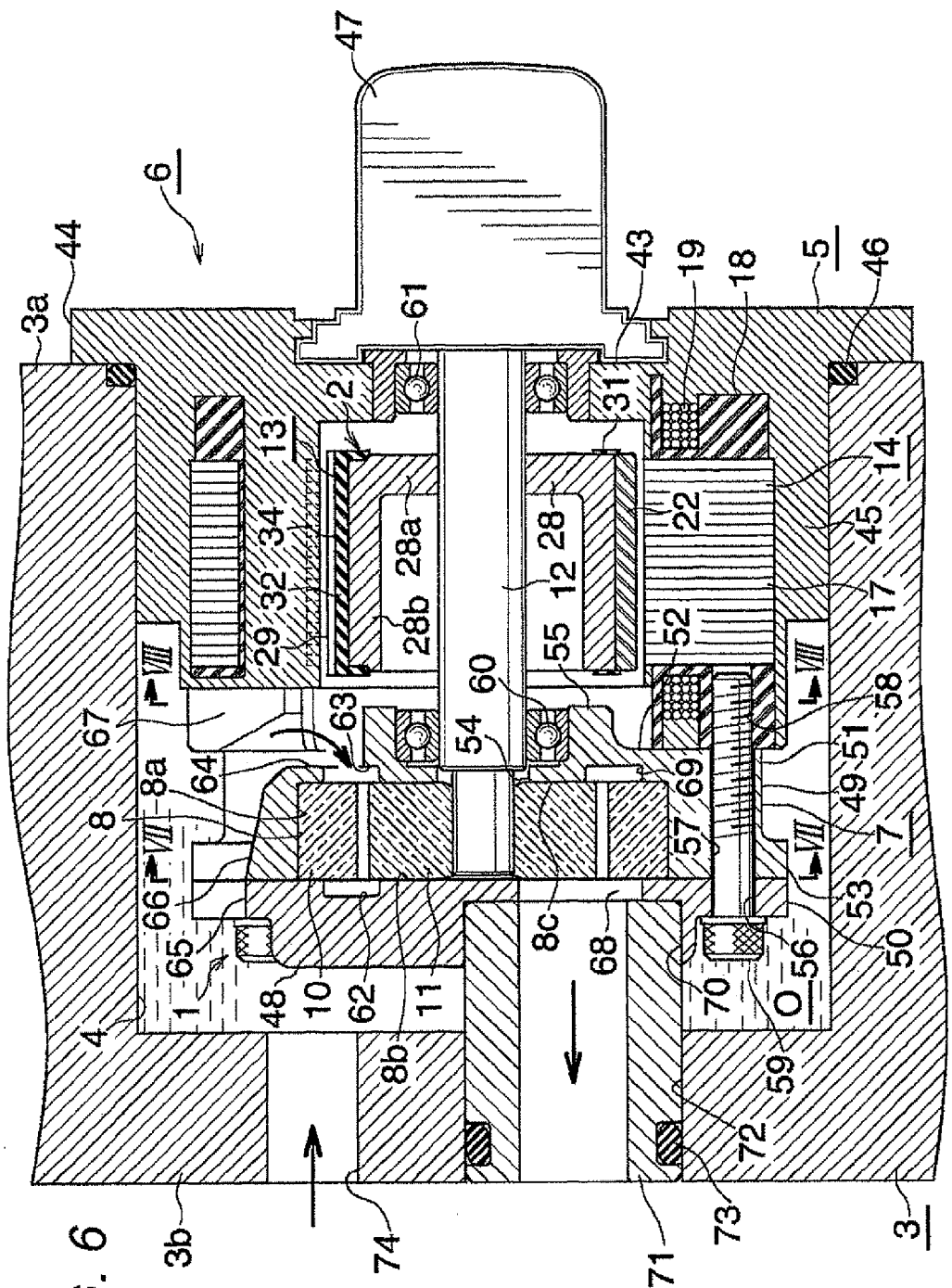
FIG. 6 is a vertical sectional view of a main part of an electric pump unit for a transmission which depicts a third embodiment of the invention.
Figure 7:
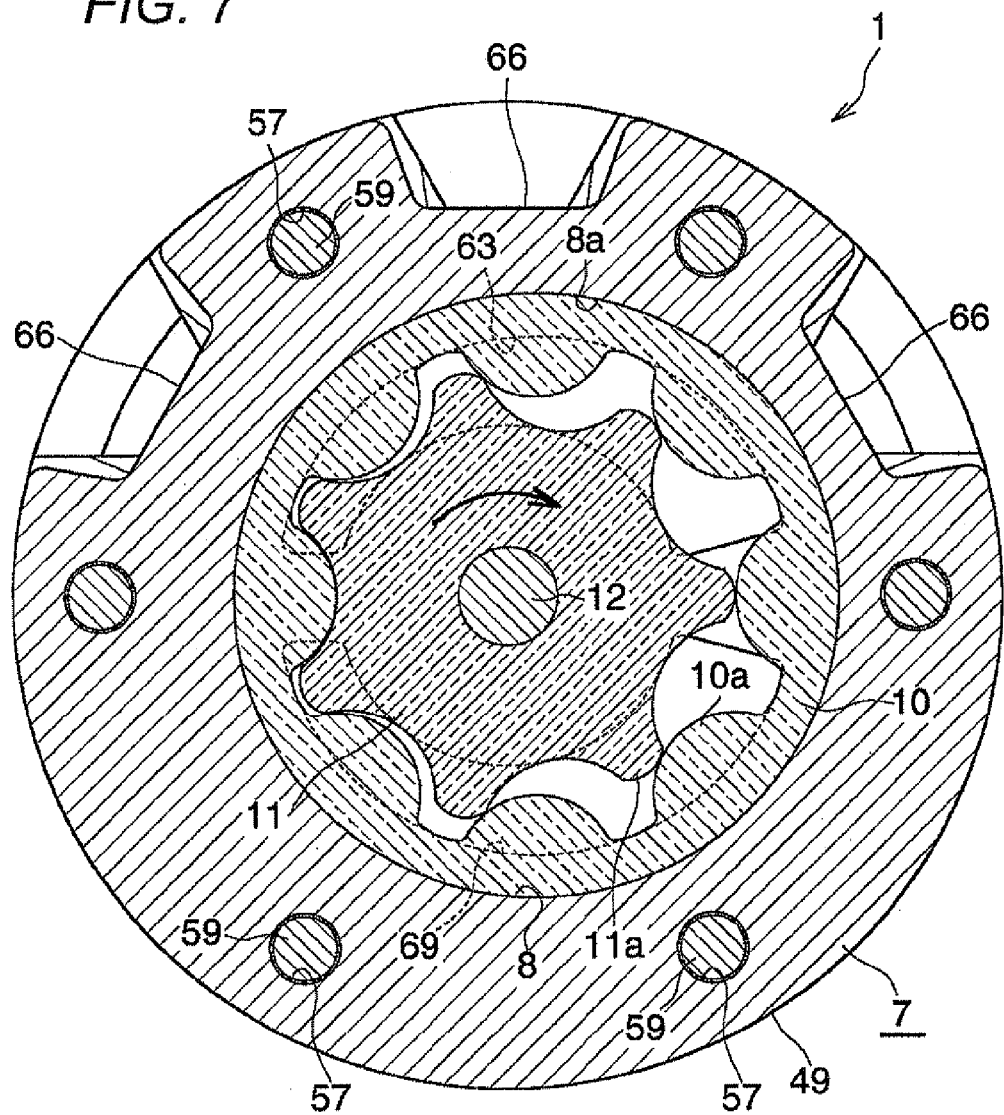
FIG. 7 is an enlarged sectional view taken along the line VII-VII in FIG. 6.
Figure 8:
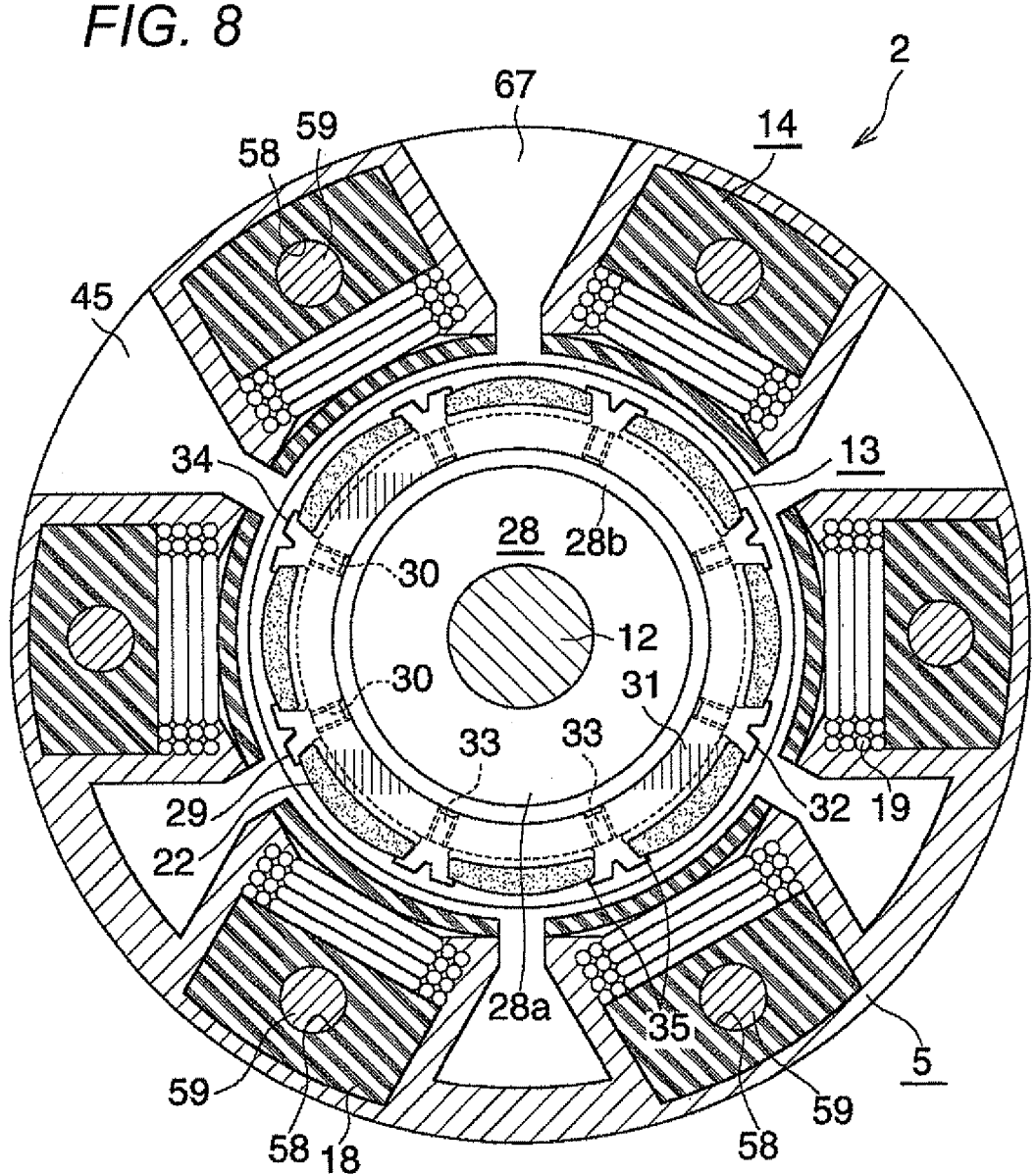
FIG. 8 is an enlarged sectional view taken along the line VIII-VIII in FIG. 6.
Figure 9:
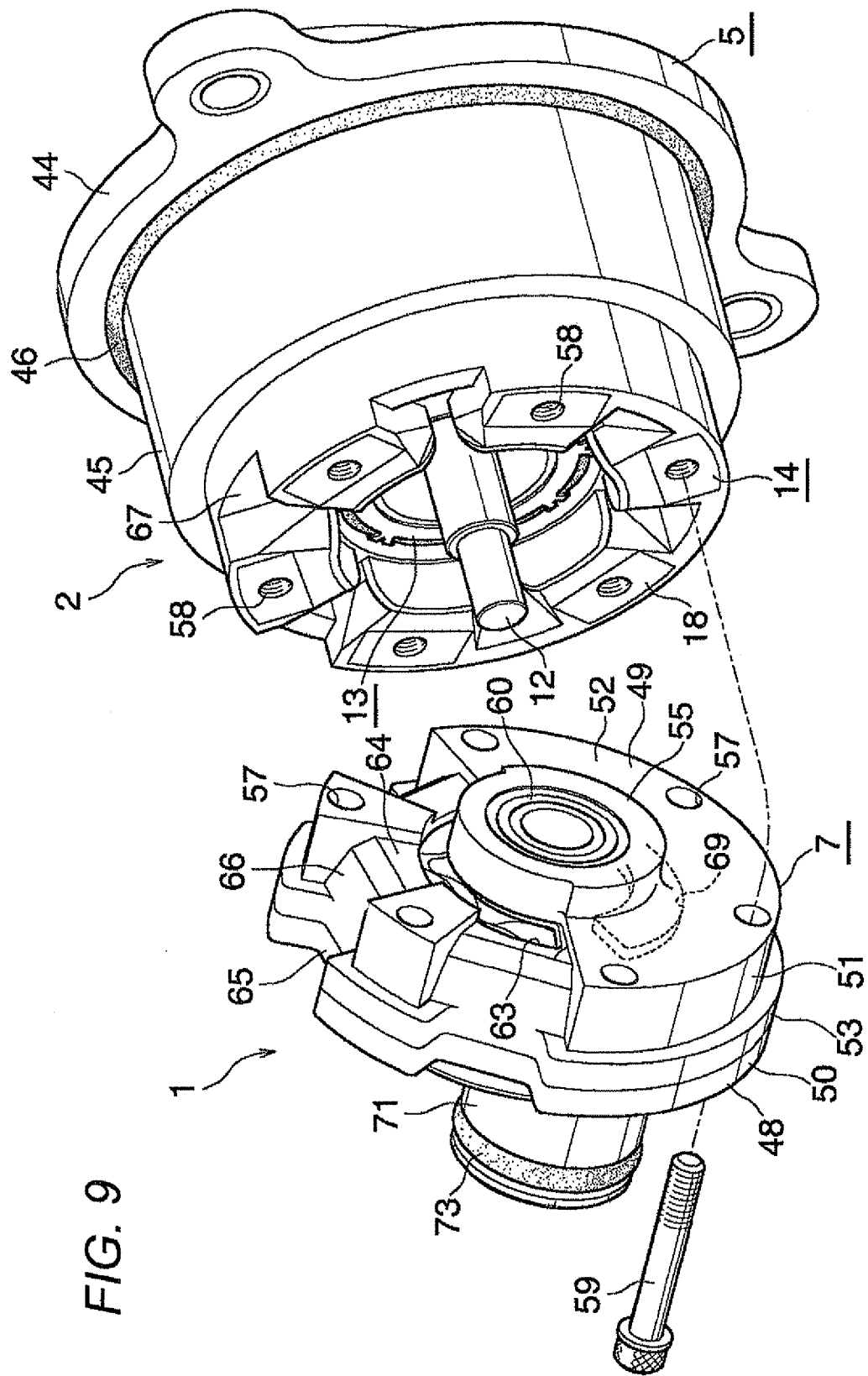
FIG. 9 is an exploded perspective view of a pump and an electric motor which are shown in FIG. 6.
Figure 10:
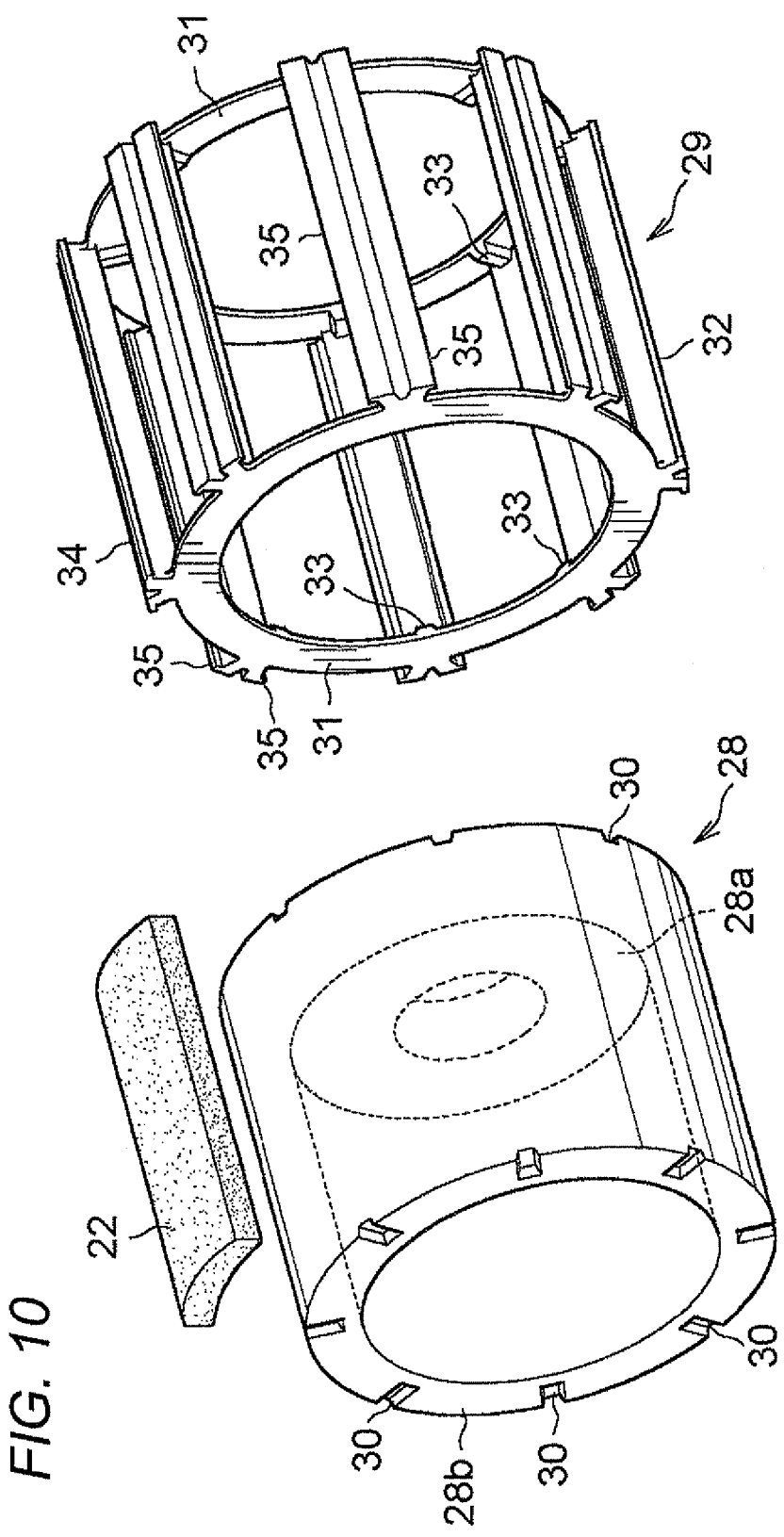
FIG. 10 is an imaginary exploded perspective view of the rotor motor shown in FIG. 6.

FIG. 6 is a drawing corresponding to FIG. 1 which depicts a third embodiment. FIG. 7 is a cross-sectional view taken along the line VII-VII in FIG. 6, and FIG. 8 is a cross-sectional view taken along the line VIII-VIII in FIG. 6. FIG. 9 is an exploded perspective view of a pump and an electric motor which are shown in FIG. 6. FIG. 10 is an imaginary exploded perspective view of a motor rotor shown in FIG. 6.

In the case of the third embodiment, a lid (5) is made of a synthetic resin and includes at a rear end portion thereof a thick cylindrical portion (45) into which an inward flange (43) and an outward flange (44) are integrated. The cylindrical portion (45) fits closely in a rear of a recess portion (4), and the outer flange (44) is brought into abutment with a rear surface of a housing vertical wall (3a) of the recess portion (4) via an O-ring (46) and is fixed thereto with bolts, not shown. A connector (47) is formed integrally on a rear end face of the lid (5) so as to close an opening inside the inward flange (43).

A pump housing (7) includes a front half member (48) and a rear half member (49) which are integrated with each other as will be described later. The front half member (48) is a relatively thick disc-shaped structure and has an outward flange (50) which is formed at a rear end portion of the front half member (48). The rear half member (49) is a structure including a relatively thick and short cylindrical portion (51) and a rear wall portion (52) which is formed integrally at a rear end of the relatively thick and short cylindrical portion (51). A space which is defined inside the cylindrical portion (51) and is closed by the front half member (48) and which has a circular cross section forms a pump compartment (8). An inner circumference of the cylindrical portion (51) is eccentric with respect to an outer circumference of the cylindrical portion (51). An inner circumferential surface of the cylindrical portion (51) of the rear half member (49) constitutes a cylindrical inner circumferential wall (8a) which defines the pump compartment (8). A rear end face of the front half member (48) constitutes a flat front end wall (8b) which defines the pump compartment (8). A front end face of the rear wall portion (52) of the rear half member (49) constitutes a flat rear end wall (8c) which defines the pump compartment (8). An outward flange (53) is formed at a front end portion of the rear half member (49). A hole (54) is formed in a center of the rear wall portion (52) of the rear half member (49) so as to penetrate the rear wall portion (52) in a front-to-rear direction. A center of this hole (54) coincides with a center of an outer circumference of the cylindrical portion (51). A short cylindrical projecting portion (55) is formed on a rear end face of the rear wall portion (52) of the rear half member (49) so as to project to the rear. An inside diameter of the projecting portion (55) is larger than an inside diameter of the hole (54), and a center of an inner circumference of the projecting portion (55) coincides with the center of the hole (54). Through holes (bolt holes) are formed in plural (six in this embodiment) locations which are equally separated along a circumferential direction of the flange (50) of the front half member (48) and the rear half member (49) which make up the pump housing (7) so as to penetrate the flange (50) and the rear half member (49) in the front-to-rear direction. Both the half members (48), (49) are diecast products of a metal such as aluminum, and the inner circumferential wall (8a) and both the end walls (8b), (8c) of the pump compartment (8) are finished through grinding.

The insulator (18) which constitutes the motor (2) is formed integrally with the cylindrical portion (45) of the lid (5). An inner circumferential surface of a core (17) is exposed to an inner circumference of the cylindrical portion (45), and a front portion of the insulator (18) projects to the front from the cylindrical portion (45). Threaded holes (58) are formed in a front end face of the insulator (19) which projects from the cylindrical portion (45) in plural locations which are equally separated along a circumferential direction of the front end face so as to correspond to the through holes (56), (57) in both the half members (48), (49).

A portion of the rear end face of the rear wall portion (52) of the rear half member (49) of the pump housing which lies closer to an outer circumference thereof is closely attached to the front end face of the insulator (19), and the pump housing (7) is integrated with the insulator (18) or a motor stator (14) with bolts (59) which are an example of screw members which are passed through the through holes (56), (57) in both the half members (48), (49) and are screwed into the corresponding threaded holes (58).

The motor shaft (12) is made of a material of an iron system. A front portion of the motor shaft (12) is supported rotatably in a front bearing unit (60) which is provided in an inner circumference of the projecting portion (55) of the rear half member (49). In addition, a rear end portion of the motor shaft (12) is supported rotatably in a rear bearing unit (61) which is provided in an inner circumference of the inward flange (43) of the lid (5). In this embodiment, each of the bearing units (60), (61) is made up of a single ball bearing which is one of rolling bearings. The front portion of the motor shaft (12) passes through the hole (54) in the rear half member (49) to enter the pump compartment (8)

and a front end portion of the motor shaft (12) is connected to a center of an inner gear (11).

An outer gear (10) is accommodated in the pump compartment (8) so that an outer circumferential surface is brought into sliding contact with the inner circumferential wall (8a) of the pump compartment (8) and both front and rear end faces are brought into sliding contact with both the front and rear end walls (8b), (8c) of the pump compartment (8). Plural internal teeth (10a) are formed on an inner circumference of the outer gear (10). The center of the inner circumferential wall (8a) of the pump compartment (8) deviates from the center of the hole (54), and therefore, the center of the outer gear (10) also deviates from the center of the hole (54). The inner gear (11) is accommodated in the pump compartment (8) so that both end faces thereof are brought into sliding contact with both the front and rear end walls (8b), (8c) of the pump compartment (8). The center of the projecting portion (55) of the rear half member (49), that is, the center of the motor shaft (12) deviates from the center of the outer gear (10), and therefore, the center of the inner gear (11) deviates from the center of the outer gear (10). Plural external teeth (11a) are formed on an outer circumference of the inner gear (11) so as to mesh with the internal teeth (10a) of the outer gear (10) in such a state that the inner gear (11) remains eccentric with the outer gear (10). The outer gear (10) and the inner gear (11) are an injection molded product of a synthetic resin.

Arc-shaped oil inlet ports (62), (63) are formed in both the end walls (8b), (8c) of the pump compartment (8) in a position which correspond to a meshing portion (an upper meshing portion in this embodiment) between the internal teeth (10a) and the external teeth (11a). In the rear half member (49), a portion at the rear of the oil inlet port (63) is removed into an arc-like shape, and the oil inlet port (63) communicates with an external portion as it is. In other words, the oil inlet port (63) communicates directly with an external portion of the electric pump unit (6). Further, in other words, the oil inlet port (63) is exposed to an external portion of the electric pump unit (6). The rear wall portion (52) of the rear body member (49) is removed to an outer circumference thereof in plural (three in this embodiment) locations which lie radially outwards of the oil inlet port (63) so as to form groove portions (64). An outer circumferential portion and the flange (53) of the rear wall portion (52) and the flange (50) of the front half member (48) are removed entirely in the front-to-rear direction so as to be continuous with the groove portions (64), whereby cutout portions (65), (66) are formed. Portions of the front end portion of the insulator (18) which correspond to the cutout portions (65), (66) are removed entirely in a width direction, whereby groove portions (67) are formed. Oil passageways which introduces oil from a radially outside of the pump housing (7) into the oil inlet port (63) is formed by the groove portions (64) of the pump housing (7) being combined with the groove portions (67) of the insulator (18). A circular oil outlet port (68) is formed in the front end wall (8b) of the pump compartment (8) in a position which corresponds to the other meshing portion (a lower meshing portion in this embodiment) between the internal teeth (10a) and the external teeth (11a), and an arc-shaped oil outlet port (69) is formed in the rear end wall (8c) of the pump compartment (8). A diametrically expanded portion (70) which is diametrically larger than the oil outlet port (68) is formed in a portion of the front half member (48) which is situated further forwards than the oil outlet port (68), and a rear end portion of an oil outlet pipe (71) fits closely in the diametrically expanded portion (70). A front portion of the outlet pipe (71) fits closely and fixedly in a through hole (72) formed in the bottom wall (3b) of the recess portion (4) via an O-ring (73). An oil inlet hole (74) which communicates with an oil pan, not shown, is formed in an upper portion in the bottom wall (3b) of the recess portion (4) such that oil (O) is filled in the interior of the recess portion (4) by way of the hole (74). Then, the pump (1) and the motor (2) are soaked in the oil (O).

When the pump (1) operates while the vehicle is stopping, the oil (O) in the recess portion (4) enters the pump compartment (8) from the oil passages formed by the groove portions (64), (67) defined between the pump housing (7) and the insulator (18) through the oil inlet port (63) and is supplied from the oil outlet port (68) to the required locations in the transmission by way of the outlet pipe (71).

In the electric pump unit (6) described above, the oil outlet port (63) communicates directly with the external portion and the oil outlet port (68) is connected directly to the outlet pipe (71). Therefore, an oil inlet hole and an oil outlet hole which enable the oil inlet port (63) and the oil outlet port (68) to communicate with the external portion do not have to be formed in the pump housing (7), whereby the pump housing (7) can be made smaller in size accordingly, and the number of fabrication steps can also be decreased.

The bearing units (60), (61) which support the motor shaft (12) are lubricated with the oil (O), and therefore, grease lubricating the bearing units and seals therefor are not necessary.

Further, the piping between the pump (1) and the transmission housing (2) is simplified, and seals only have to be established between the lid (5) and the outlet pipe (71) and the transmission housing (3), whereby waterproofing becomes simple.

In addition, this embodiment can also be applied to an electric pump unit other than the electric pump unit for a transmission.

The other features remain the same as those of the first embodiment.

The overall configuration of the electric pump unit (6) and the configurations of the individual constituent portions are not limited to those described in the embodiment above but can be altered as required.

Hereinafter, referring to the drawing, a fourth embodiment of the invention will be described. Like reference numerals will be given to like portions to those described in the first to third embodiments (in particular, the second embodiment), and the description thereof will be omitted.

Figure 11:
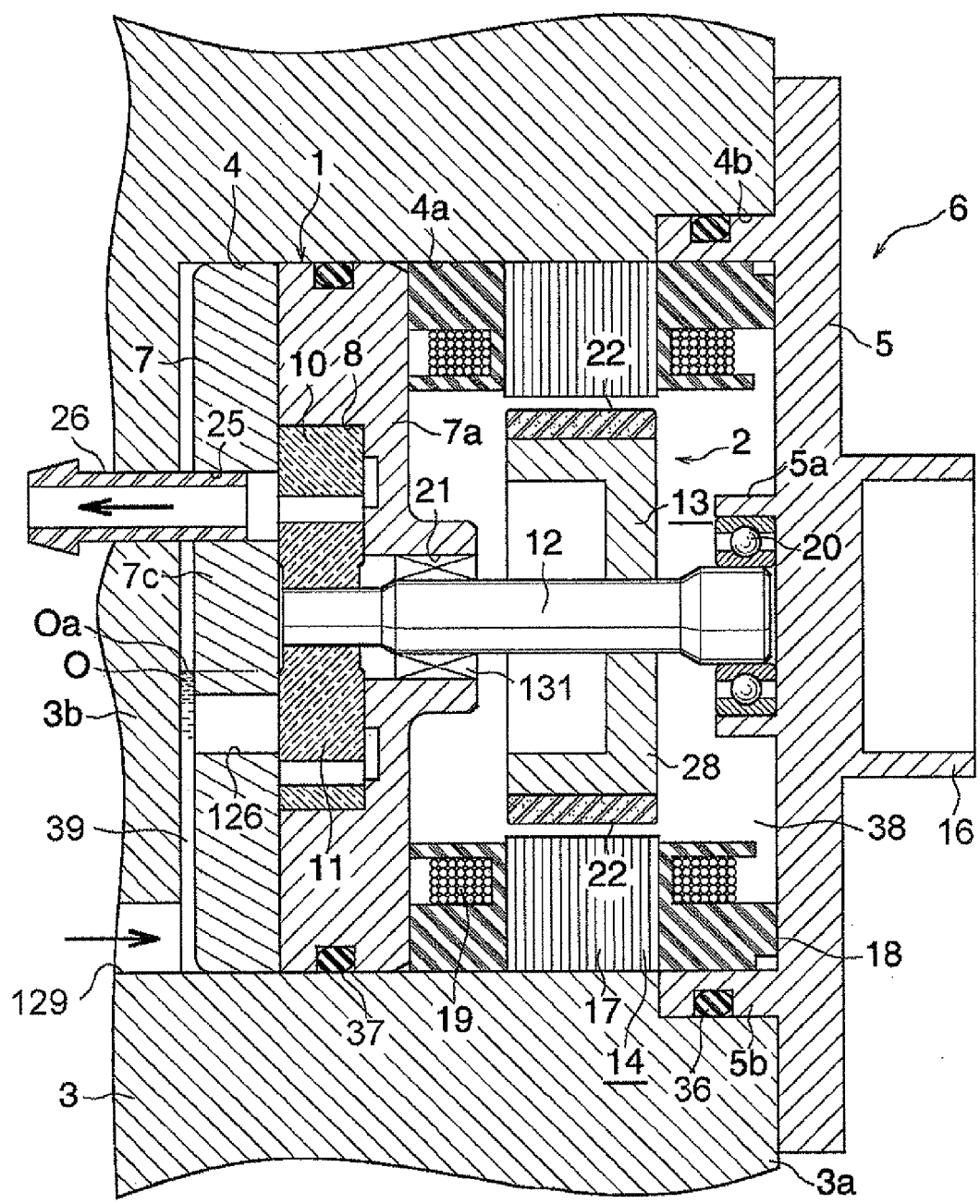
FIG. 11 is a vertical sectional view of a main part of an electric pump unit for a transmission which depicts a fourth embodiment of the invention.

FIG. 11 is a vertical sectional view showing a portion of an electric pump unit (6) for a transmission of a motor vehicle for idle reduction, the portion incorporating a pump (1) and a pump driving electric motor (2). In the following description, a left-hand side of FIG. 11 is referred to a front and a right-hand side as a rear of the electric pump unit (6).

As FIG. 11 shows, an O-ring (36) which constitutes a seal is provided between an outer circumference of a short cylindrical portion (5b) and an inner circumference of a diametrically expanded portion (4b). In addition, a part of a stator (14) is in contact with a circumferential wall (4a) of a recess portion (4). Additionally, an oil seal (131) is provided between a motor shaft (12) and a circumferential wall of a hole (21).

A pump housing (7) fits almost closely in the recess portion (4), and an O-ring (37) is provided between an outer circumference of the pump housing (7) and the circumferential wall (4a) of the recess portion (4) for establishing a seal therebetween. An interior of the recess portion (4) is divided into a relatively large waterproofed opening side space (38) which includes a motor (2) and which is defined on a rear side of the pump housing (7) and a relatively small bottom side space (39) which is defined on a front side of the pump housing (7) by the two O-rings (36, 37). An oil inlet port (126) and an oil outlet port (25) are formed in a lower portion and an upper portion of a front wall (7c) of the pump housing (7) which faces the bottom side space (39), respectively. An outlet pipe (26) is connected to the oil outlet port (25). The outlet pipe (26) penetrates a bottom wall (3b) of the recess portion (4) of a transmission housing (3) and is connected to a required location in a transmission or is connected to the required location in the transmission via another pipe, although the illustration thereof is omitted.

An oil inlet hole (129), which communicates with an oil pan, not shown, is formed at a lower portion of the bottom wall (3b) of the recess portion (4) on a housing vertical wall (3a), so that oil (O) enters the bottom side space (39) through the hole (129). Then, an interior of the recess portion (4) is soaked in the oil (O) up to an upper portion than the oil inlet port (126) in the pump housing (7).

A controller (whose illustration is omitted) of the motor (2) is disposed outside the transmission, and is connected to the motor (2) via a connector (16) on a lid (5).

The motor (2) stops while the vehicle is running, and consequently, the pump (1) also stops.

The motor (2) operates while the vehicle is stopping, whereby the pump (1) also operates. When the pump (1) starts to operate, the oil (O) within the bottom side space (39) is taken in from the inlet port (126), is then discharged from the oil outlet port (25) into the outlet pipe (26) and is eventually supplied to the required location in the transmission by way of the outlet pipe (26).

In the electric pump unit (6) for a transmission, the pump (1) and the pump driving electric motor (2) are provided within the transmission housing (3), and therefore, the unit housing of the conventional electric pump unit is not necessary. Consequently, the electric pump unit (6) can be made compact in size, and the weight and fabrication costs thereof can be decreased. In addition, since the electric pump unit (6) operates while the vehicle is stopping, the height of an oil level (Oa) of the hydraulic oil (O) can be controlled only by controlling the amount of the hydraulic oil (O).

The waterproofing of the electric motor (2) can be ensured by the O-rings (36), (37) which are disposed in the two locations. Because of this, the electric motor (2) is free from oil stirring resistance, whereby the efficiency of the motor is increased. Because of this, the electric motor (2) can be made smaller in size. Since the electric pump unit (6) is designed to introduce the oil into the bottom side space (39) only, a complex piping is not necessary which would otherwise be necessary so as to allow the oil to flow into and out of the pump (1). In the embodiment described above, the outlet pipe (26) is only piping connected to the pump (1), and therefore, the construction of the electric pump unit (6) becomes extremely simple.

A part of the motor stator (14) is in contact with the transmission housing (3) with a large heat capacity, and therefore, heat generated in the stator (14) is dissipated with good efficiency.

The configuration of the electric pump unit (6) for a transmission and the configurations of the constituent portions are not limited to those described in the embodiment above but can be altered as required.

In the embodiment described above, in a motor rotor (13), plural permanent magnets (22) are fixed to an outer circumference of a cylindrical rotor main body (28) with an appropriate means such as bonding. However, as is illustrated in the first to third embodiments, the plural permanent magnets (22) may be held by a synthetic resin permanent magnet holding member (29) which is fixedly provided on the outer circumference of the rotor main body (28).

Hereinafter, referring to the drawing, a fifth embodiment of the invention will be described. Like reference numerals will be given to like portions to those described in the first to fourth embodiments (in particular, the fourth embodiment), and the description thereof will be omitted.

Figure 12:
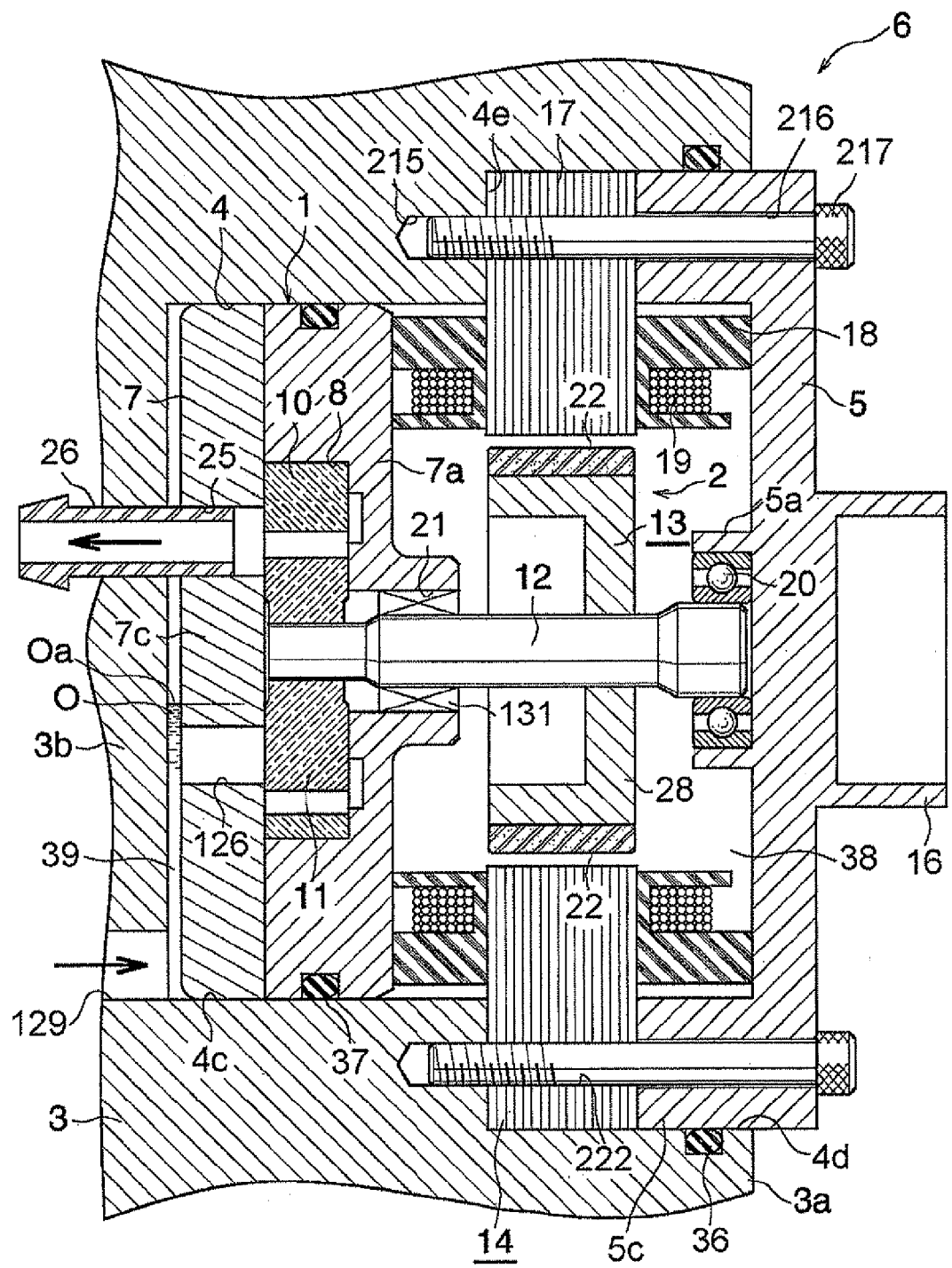
FIG. 12 is a vertical sectional view of a main part of an electric pump unit for a transmission which depicts a fifth embodiment of the invention.

FIG. 12 is a vertical sectional view showing a portion of an electric pump unit (6) for a transmission of a motor vehicle for idle reduction, the portion incorporating a pump (1) and a pump driving electric motor (2). In the following description, a left-hand side of FIG. 12 is referred to a front and a right-hand side as a rear of the electric pump unit (6).

A recess portion (4) is formed into a step-like structure and includes a bottom side (a front) diametrically small portion (4c) and an opening side (a rear) diametrically large portion (4d). Plural threaded holes (215) are formed in an annular end face (4e) between the diametrically small and diametrically large portions.

A lid (5) has a circular disc-like shape, and a relatively thick cylindrical portion (5c) which projects to the front is formed integrally along a circumferential portion of the lid (5). Plural bolt holes (216) are formed in the cylindrical portion (5c) so as to correspond to the threaded holes (215). The cylindrical portion (5c) fits in the diametrically large portion (4d) of the recess portion (4) and is fixed to a vertical wall (3a) with plural bolts (217) which are passed through the bolt holes (216) and are then screwed into the threaded holes (215), as will be described in detail. An inside diameter of the cylindrical portion (5c) is almost equal to an inside diameter of the diametrically small portion (4c) of the recess portion (4). A diametrically small short cylindrical portion (5a) is formed integrally at a central portion of a front surface (an inner surface) of the lid (5) so as to be concentric with the recess portion (4), and a connector (16) is formed on a rear surface (an outer surface) of the lid (5).

A stator (14) is configured such that an insulator (a synthetic resin insulation member) (18) is incorporated in a core (17) including laminated steel plates and a coil (19) is wound around a portion of the insulator (18). An outside diameter of the core (17) is almost equal to an inside diameter of the diametrically large portion (4d) of the recess portion (4). An outside of the insulator (18) is slightly smaller than an inside diameter of the diametrically small portion (4c) of the recess portion (4). Plural bolt holes (222) corresponding to the bolt holes (216) in the lid (5) are formed at a portion of the stator (14) where the core (17) projects further radially outwards than the insulator (18). An outer circumferential portion of the core (17) fits closely in a front portion of the diametrically large portion (4d) of the recess portion (4), and a front surface of the outer circumferential portion of the core (17) is in press contact with the annular end face (4e) of the recess portion (4). A front portion of the cylindrical portion (5c) of the lid (5) fits in the diametrically large portion (4d) of the recess portion (4) which is situated at a rear of the core (17). Then, the bolts (217) are passed through the bolt holes (216) in the cylindrical portion (5c) and the bolt holes (222) in the core (17) and are then screwed into the threaded holes (215), whereby not only is the lid (5) fixed to the vertical wall (3a), but also the outer circumferential portion of the core (17) is fixedly held between the annular end face (4e) of the recess portion (4) and a front end face of the cylindrical portion (5c) of the lid (5). As a result of this, both end faces of the outer circumferential portion and a portion on an outer circumferential surface which extends over a relatively wide area of the core (17) are in contact with the vertical wall (3a) and the lid (5). An O-ring (36) constituting a seal is provided between an outer circumference of the cylindrical portion (5c) of the lid (5) and an inner circumference of the diametrically large portion (4d). A rear end face of the insulator (18) is in contact with the front surface of the lid (5). Although the illustration thereof is omitted, the coil (19) is connected to the connector (16). A rear end face of the pump housing (7) is fixed to a front end face of the insulator (18) with an appropriate means such as bonding.

In the electric pump unit (6) for a transmission, the pump (1) and the pump driving electric motor (2) are provided within a transmission housing (3), and therefore, the unit housing of the conventional electric pump unit is not necessary. Consequently, the electric pump unit (6) can be made compact in size and the weight and fabrication costs thereof can be decreased. Since the electric pump unit (6) operates while the vehicle is stopping, the height of an oil level (Oa) of hydraulic oil (O) can be controlled only by controlling the amount of the hydraulic (O).

The waterproofing of the electric motor (2) can be ensured by the O-rings (36), (37) which are disposed in the two locations. Because of this, the electric motor (2) is free from oil stirring resistance, and hence, the efficiency of the motor is increased, whereby the electric motor (2) can be made smaller in size. Since the electric pump unit (6) is designed to introduce oil into a bottom side space (21) only, a complex piping is not necessary which would otherwise be necessary so as to allow the oil to flow into and out of the pump (1). In the embodiment described above, an oil outlet pipe (38) is only piping connected to the pump (1), and therefore, the construction of the electric pump unit (6) becomes extremely simple.

The portion of the core (17) of the stator (14) which extends over the relatively wide area is in contact with the transmission housing (3) having a large heat capacity, and therefore, heat generated in the stator (14) is dissipated with good efficiency. In addition, an outer circumference of the insulator (18) of the motor stator (14) may be brought into contact with an inner circumference of the diametrically small portion (4c) of the recess portion (4) and an inner circumference of the cylindrical portion (5c) of the lid (5), so that heat is also dissipated from this portion.

The configurations of the individual constituent portions of the electric pump unit (6) for a transmission are not limited to those described in the embodiment but can be altered as required.

For example, in the embodiment described above, in the motor rotor (13), plural permanent magnets (22) are fixed to an outer circumference of a cylindrical rotor main body (28) with an appropriate means such as bonding. However, as is illustrated in the first to third embodiments, the plural permanent magnets (22) may be held in a synthetic resin permanent magnet holding member (29) which is fixedly provided on the outer circumference of the rotor main body (28).

Hereinafter, referring to the drawing, a sixth embodiment of the invention will be described. Like reference numerals will be given to like portions to those described in the first to fifth embodiments (in particular, the second embodiment), and the description thereof will be omitted.

Figure 13:
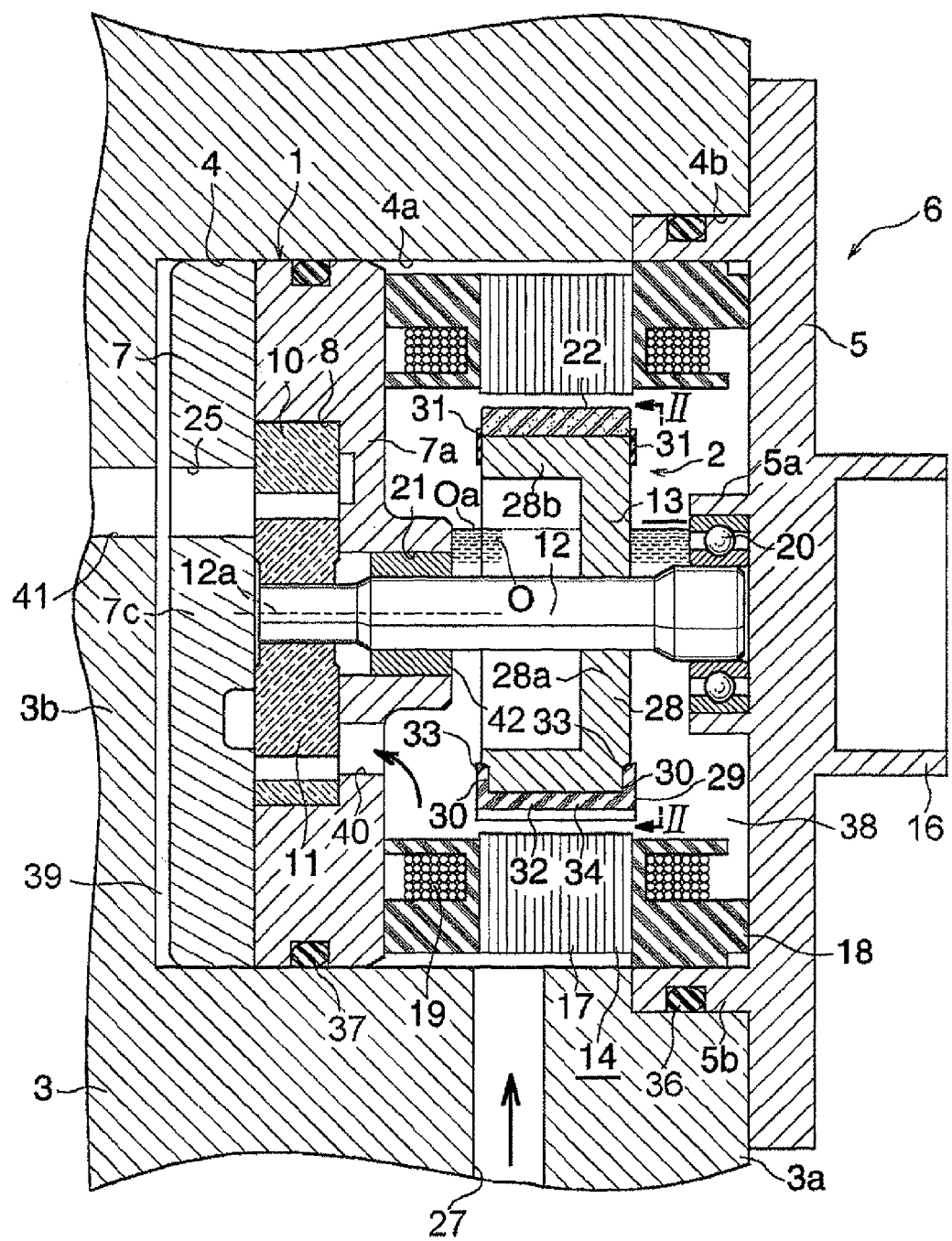
FIG. 13 is a vertical sectional view of a main part of an electric pump unit for a transmission which depicts a sixth embodiment of the invention.

FIG. 13 is a vertical sectional view showing a portion of an electric pump unit (6) for a transmission of a motor vehicle for idle reduction, the portion incorporating a pump (1) and a pump driving electric motor (2). In the following description, a left-hand side of FIG. 13 is referred to a front and a right-hand side as a rear of the electric pump unit (6).

As FIG. 13 shows, a pump housing (7) fits almost closely in a recess portion (4), and an O-ring (37) is disposed between an outer circumference of the pump housing (7) and a circumferential wall (4a) of the recess portion (4) for establishing a seal therebetween. Then, an interior of the recess portion (4) is divided by two O-rings (36), (37) into an opening side space (38) which functions as a relatively wide low pressure space portion including a motor (2) and situated at a rear side (an opening side) of the pump housing (7) and a bottom side space (39) which functions as a relatively narrow high pressure space portion which is situated at a front side (a bottom side) of the pump housing (7). An oil inlet port (40), which faces the opening side space (38) which functions as the low pressure space, is formed in a lower portion of a rear wall (7a) of the pump housing (7). The oil inlet port (40) is such that an arc-shaped inlet port which is formed in the rear wall (7a) is extended so as to penetrate the rear wall (7a). Because of this, a separate oil inlet port from that inlet port does not have to be provided. An oil outlet port (25), which faces the bottom side space (39) which functions as the high pressure space portion, is formed in an appropriate location on a front wall (7c) of the pump housing (7).

An oil inlet hole (27), which communicates with an oil pan, not shown, is formed at a lower portion of the circumferential wall (4a) of the recess portion (4) on a housing vertical wall (3a), such that oil (O) enters an interior of the opening side space (38) which functions as the low pressure space portion through the hole (27). In addition, by disposing the electric pump unit (6) in a position which is situated lower than an oil level in the oil pan, the interior of the opening side space (38) is soaked in the oil (O) up to an upper portion than the oil inlet port (40) in the pump housing (7). In this embodiment, the electric pump unit (6) is designed to introduce the oil (O) up to an upper portion than a center (12a) of a motor shaft (12).

An oil outlet port (41), which communicates with the bottom side space (39) which functions as the high pressure space portion, is formed in a bottom wall (3b) of a housing vertical wall (3a). When necessary, the oil outlet hole (41) is connected to a required location in a transmission via piping, not shown.

A controller (whose illustration is omitted) of a motor (2) is disposed outside the transmission and is connected to the motor (2) via a connector (16) on a lid (5).

The motor (2) stops while the vehicle is running, and consequently, the pump (1) also stops.

The motor (2) operates while the vehicle is stopping, whereby the pump (1) also starts to operate. When the pump (1) starts to operate, the oil (O) in the opening side space (38) which functions as the low pressure space is taken in from the oil inlet port (40), is then discharged from the oil outlet port (25) through the bottom side space (39) which functions as the high pressure space portion and the oil outlet hole (41) and is eventually supplied to the required location in the transmission.

In the electric pump unit (6) for a transmission, since the pump (1) and the pump driving electric motor (2) are provided within a transmission housing (3), the unit housing of the conventional electric pump unit is not necessary. Consequently, the electric pump unit (6) can be made compact in size, and the weight and fabrication costs thereof can be decreased. Since the electric pump unit (6) operates while the vehicle is stopping, the height of an oil level (Oa)

of hydraulic oil (O) can be controlled only by controlling the amount of the hydraulic oil (O).

The interior of the recess portion (4) is divided into the opening side space (38) which functions as the low pressure space portion situated on the oil inlet side and the bottom side space (39) which functions as the high pressure space portion situated on the oil outlet side by the O-rings (36), (37) which are disposed in the two locations. Therefore, piping is not necessary which connects an oil outlet pipe to the oil outlet port (25) in the pump housing (7), whereby the construction of the electric pump unit (6) associated with the pump housing (7) and the incorporating work of the pump housing (7) become simple.

The portion of the interior of the recess portion (4) which lies lower than the center (12a) of the motor shaft (12) is soaked in the oil (O). Therefore, a ball bearing of a bearing unit (20) which supports the motor shaft (12) is soaked in the oil (O) and is lubricated by the oil (O). Because of this, grease for lubricating the ball bearing and a seal therefor are not necessary.

A part of a motor stator (14) is in contact with the transmission housing (3) having a large heat capacity via the lid (5), and therefore, heat generated in the stator (14) is dissipated with good efficiency, whereby the electric motor (2) can be made smaller in size.

The configurations of the individual constituent portions of the electric pump unit (6) for a transmission are not limited to those described in the embodiment above but can be altered as required.

Hereinafter, referring to the drawing, a seventh embodiment of the invention will be described. Like reference numerals will be given to like portions to those described in the first to sixth embodiments (in particular, the first embodiment), and the description thereof will be omitted.

Figure 14:
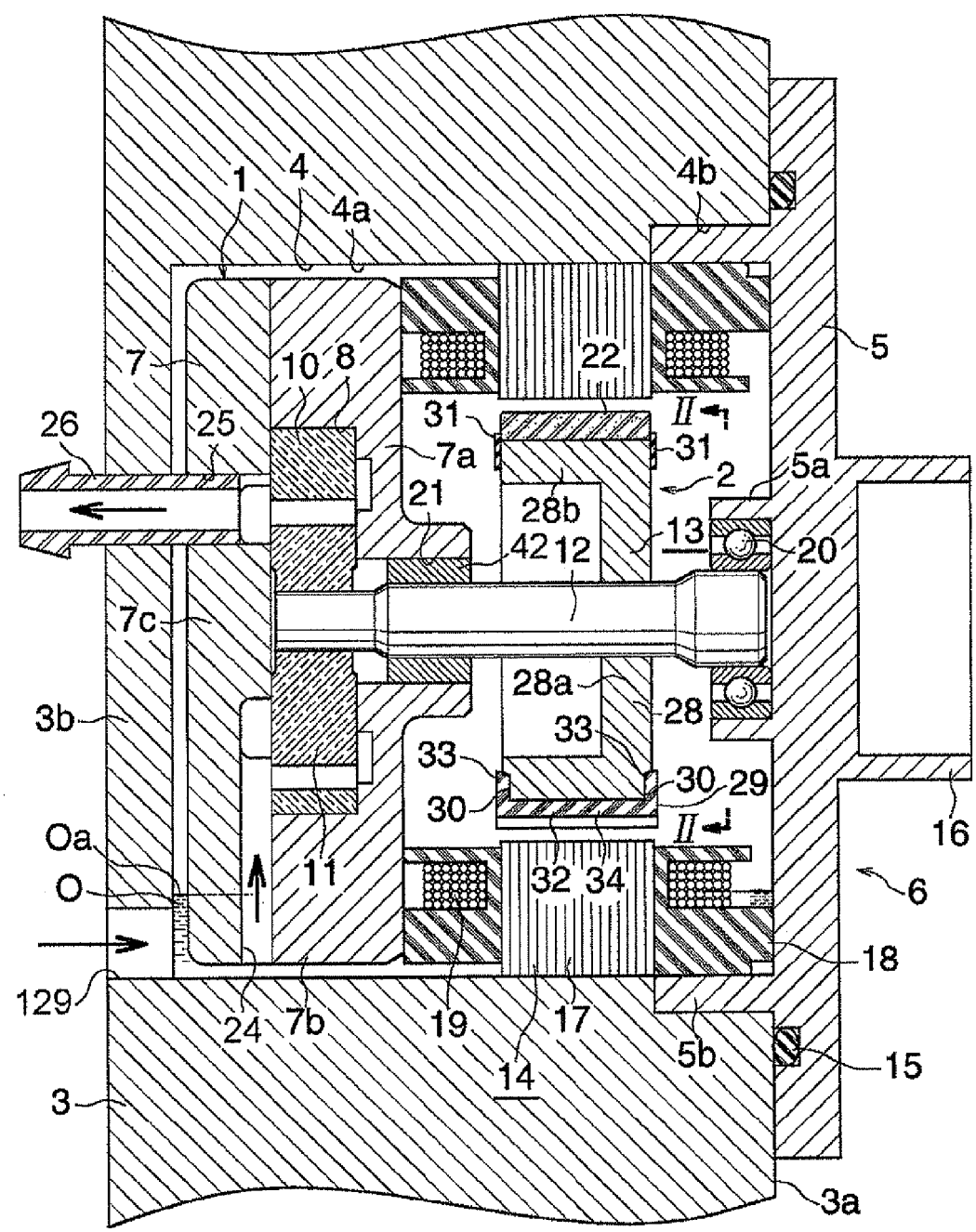
FIG. 14 is a vertical sectional view of a main part of an electric pump unit for a transmission which depicts a seventh embodiment of the invention.

FIG. 14 is a vertical sectional view showing a portion of an electric pump unit (6) for a transmission of a motor vehicle for idle reduction, the portion incorporating a pump (1) and a pump driving electric motor (2). In the following description, a left-hand side of FIG. 14 is referred to a front and a right-hand side as a rear of the electric pump unit (6).

As FIG. 14 shows, a circumferential wall (4a) is removed at a rear end portion of a recess portion (4) so that a diametrically expanded portion (4b) is formed. A diametrically small, short cylindrical portion (5a) and a diametrically large, short cylindrical portion (5b) are formed integrally so as to be concentric with the recess portion (4) on a front surface (an inner surface) of a lid (5), and a connector (16) is formed on a rear surface (an outer surface) of the lid (5). The diametrically large, short cylindrical portion (5b) fits in the diametrically expanded portion (4b) of the recess portion (4), and an inner circumferential surface of the short cylindrical portion (5b) constitutes an extension of the circumferential wall (4a) of the recess portion (4).

An inlet hole (129), which communicates with an oil pan, not shown, is formed at a lower portion of a bottom wall (3b) of the recess portion (4) on a housing vertical wall (3a), such that oil (O) enters an interior of the recess portion (4). Then, a lower portion of a stator (14) is soaked in the oil (O).

The motor (2) operates while the vehicle is stopping, whereby the pump (1) also operates. When the pump (1) operates, the oil (O) in the interior of the recess portion (4) is taken in from an inlet hole (24), is then discharged into an outlet pipe (26) from an outlet port (25) and is eventually supplied to a required location in a transmission through the outlet pipe (25).

In the electric pump unit (6) for a transmission, since the pump (1) and the pump driving electric motor (2) are provided within a transmission housing (3), the unit housing of the conventional electric pump unit is not necessary, and consequently, the waterproofing of the unit housing is also not necessary. Since a controller of the electric motor (2) is not provided in an interior of the transmission housing (3), the waterproofing of the transmission housing (3) is also not necessary. Only the lower portion of the stator (14) is soaked in the oil (O), and therefore, no seal has to be established between the pump (1) and the electric motor (2). Consequently, the electric pump unit (6) can be made compact in size, and the weight and fabrication costs thereof can be decreased. In addition, since the electric pump unit (6) operates while the vehicle is stopping, the height of an oil level (Oa) of the hydraulic oil (O) can be controlled only by controlling the amount of the hydraulic oil (O).

Since a part of the motor stator (14) is in contact with the transmission housing (3) having a large heat capacity, heat generated in the stator (14) is dissipated with good efficiency. Further, heat generated in the stator (14) is also dissipated from the portion thereof which is soaked in the oil (O). Because of this, the size of the portion of the electric pump unit (6) where the electric pump resides does not have to be enlarged for heat dissipation, whereby the portion of the electric pump unit (6) where the electric pump resides can be made compact in size, and the weight and fabrication costs thereof can be decreased.

The configurations of the individual constituent portions of the electric pump unit (6) for a transmission are not limited to those described in the embodiment above but can be altered as required.

In the embodiment described above, a front portion of a motor shaft (12) is supported by a slide bearing made up of a bush (42). However, the front portion may be supported by a rolling bearing such as a ball bearing as a rear portion of the motor shaft (12) is done.

Hereinafter, referring to the drawing, an eighth embodiment of the invention will be described. Like reference numerals will be given to like portions to those described in the first to seventh embodiments (in particular, the first embodiment), and the description thereof will be omitted.

Figure 15:
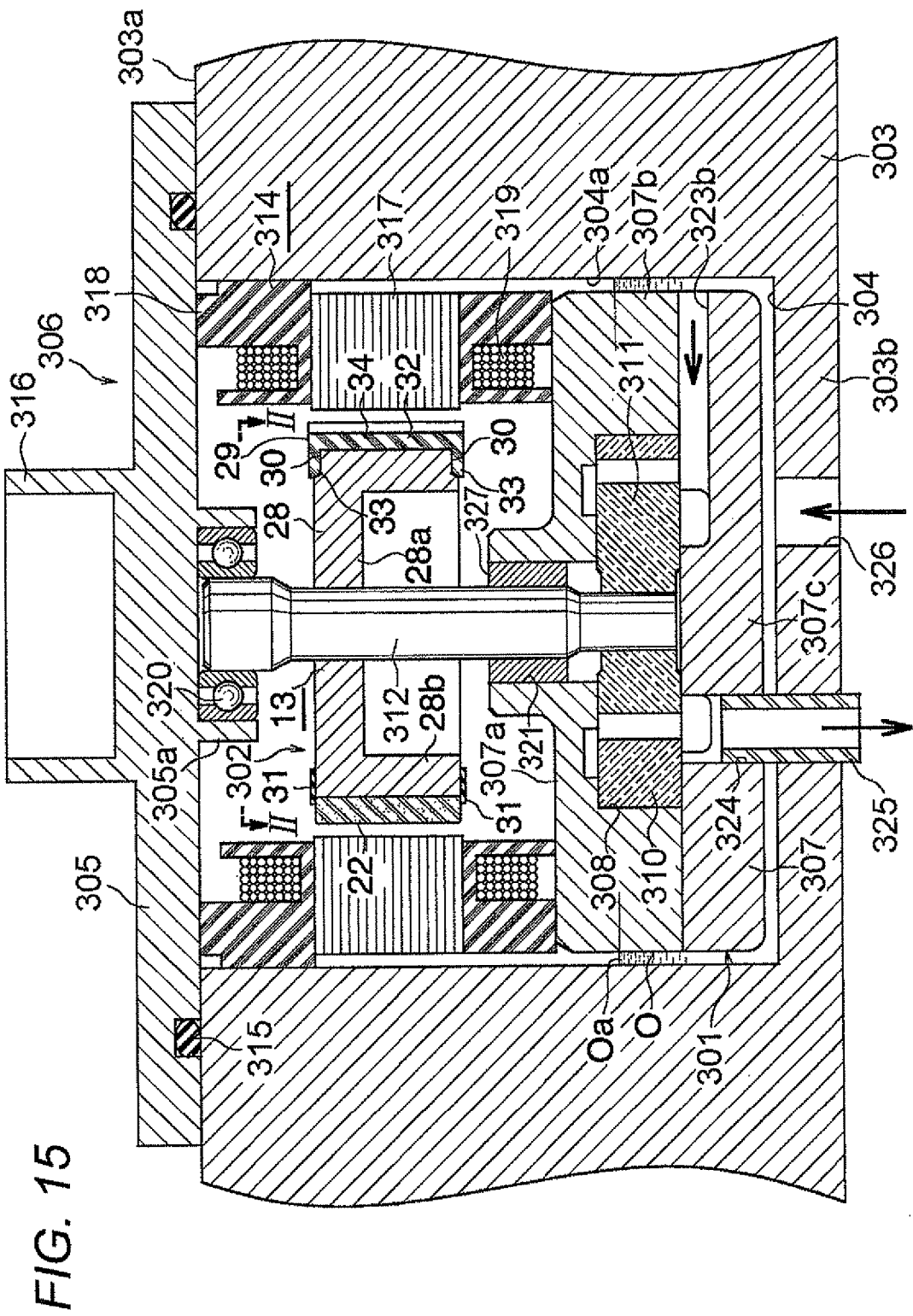
FIG. 15 is a vertical sectional view of a main part of an electric pump unit for a transmission which depicts an eighth embodiment of the invention.

FIG. 15 is a vertical sectional view showing a portion of an electric pump unit (306) for a transmission of a motor vehicle for idle reduction, the portion incorporating a pump (301) and a pump driving electric motor (302).

The electric pump unit (306) for a transmission according to the embodiment is such as to be used to compensate, in an auxiliary fashion, for a hydraulic pressure in a transmission of a motor vehicle which decreases when idle reduction is performed. The electric pump unit (306) is, as FIG. 15 shows, disposed within a recess portion (304), which has a bottomed circular shape opened at an upper portion thereof, formed in a horizontal upper wall (303a) which constitutes a transmission housing (303) for the transmission of the motor vehicle. The pump (301) and the motor (302) are integrated with a lid (305), and the electric pump unit (306) for a transmission is made up of these constituent components. The motor (302) is disposed underneath the lid (305), and the pump (301) is disposed below the motor (302). The pump (301) and the motor (302) are fitted in the recess portion (304), and the lid (305) tightly closes an upper opening of the recess portion (304). In this embodiment, the pump (301) is an internal gear pump, and the motor (302) is a DC brushless motor having three-phase windings.

The pump (301) includes a pump housing (307) having a short cylindrical shape. An outer gear (an outer rotor) (310) is rotatably accommodated within a pump compartment (308) which is defined within the pump housing (307). An inner gear (an inner rotor) (311), which meshes with the outer gear (310), is disposed inside the outer gear (310).

The motor (302) includes a perpendicularly disposed pump driving motor shaft (312), a motor rotor (13) which is fixed to an upper portion of the motor shaft (312), and a motor stator (314) which is disposed around a circumference of the motor rotor (13).

The lid (305) has a circular disk shape and is fixed to an upper surface of the upper wall (303a) around a circumference of the recess portion (304) via an O-ring (315) with an appropriate means such as bolts, not shown. A short cylindrical portion (305a), which is concentric with the recess portion (304), is formed integrally at a central portion of a lower surface (an inner surface) of the lid (305), and a connector (316) is formed on an upper surface (an outer surface) of the lid (305).

The stator (314) is configured such that an insulator (a synthetic resin insulation member) (318) is incorporated in a core (317) including laminated steel plates and a coil (319) is wound around a portion of the insulator (318). An upper end face of the insulator (318) is fixed to the lower surface of the lid (305) by an appropriate means such as bonding. Preferably, a part of the stator (314) is in contact with a circumferential wall (304a) of the recess portion (304). Although the illustration thereof is omitted, the coil (319) is connected to the connector (316). An upper surface of the pump housing (307) is fixed to a lower end face of the insulator (318) by an appropriate means such as bonding. An upper end portion of the motor shaft (312) is rotatably supported in a bearing unit (320) provided within the short cylindrical portion (305a) of the lid (305). In this embodiment, the bearing unit (320) is made up of a single ball bearing which is one of rolling bearings. Note that the bearing unit (320) is not limited to the ball bearing, and hence, a roller bearing or a needle bearing may be used as the bearing unit (320). In addition, the bearing unit (20) is not limited to the rolling bearing, and hence, various types of bearing units including slide bearings may be used as the bearing unit. A lower portion of the motor shaft (312) passes through a portion of an upper wall (307a) of the pump housing (307) where a hole (321) is formed to enter the pump compartment (308), and a lower end portion of the motor shaft (312) is connected to the inner gear (311) of the pump (301). A bush (327) is interposed between the motor shaft (312) and a circumferential wall of the hole (321), and no seal is provided in that portion. The bush (327) is fitted in the hole (321), and an inner circumferential surface of the bush (327) and an outer circumferential surface of the motor shaft (312) slide on each other, whereby a slide bearing is configured thereat. The rotor (13) is formed into a cylindrical structure which extends radially outwards from an upper portion of the motor shaft (312) and surrounds the motor shaft (312) inside the stator (314). Permanent magnets (22) are provided around an outer circumference of the rotor (13). A gap is provided between an outer circumferential surface of the pump housing (307) and the circumferential wall of the recess portion (304). An oil inlet port (323) is provided in an appropriate location on a circumferential wall (307b) of the pump housing (307). An oil outlet port (324) is formed in an appropriate location on a lower wall (307c) of the pump housing (307), and an outlet pipe (325) is connected to the oil outlet port (324). The outlet pipe (325) penetrates a bottom wall (303b) of the recess portion (304) in the transmission housing (303) and is connected to a required location in the transmission or is connected to the required location in the transmission via another pipe, although the illustration thereof is omitted.

An inlet hole (326), which communicates with an oil pan, not shown, is formed in the bottom wall (303b) of the recess portion (304) on the housing upper wall (303a), such that oil (O) enters an interior of the recess portion (304) through the hole (326). In addition, the motor shaft (312) is disposed perpendicular relative to an oil level (Oa) so that the motor (302) is situated above the pump (301), and vertical positions of the pump (301) and the motor (302) are determined so that the oil level (Oa) within the recess portion (304) is situated above the oil inlet port (323) and below the stator (314) and the rotor (13).

The details of the rotor (13) are similar to those described in the first embodiment which is shown in FIGS. 2 to 4, and therefore, the description thereof will be omitted.

The motor (302) operates while the vehicle is stopping, whereby the pump (301) also operates. When the pump (301) starts to operate, the oil (O) within the recess portion (304) is taken in from the oil inlet port (323), is then discharged from the oil inlet port (324) into the outlet pipe (325) and is eventually supplied to a required location in the transmission through the outlet pipe (325).

In the electric pump unit (306) for a transmission, since the pump (301) and the pump driving electric motor (302) are provided in the transmission housing (303), the unit housing of the conventional electric pump unit is not necessary. Consequently, the waterproofing of the unit housing is also not necessary. A controller of the electric motor (302) is not provided within the transmission housing (303), and the waterproofing of the transmission housing (303) is also not necessary. The motor shaft (301) is disposed perpendicular relative to the oil level (Oa) so that the electric motor (302) is situated above the pump (301), and the vertical positions of the pump (301) and the electric motor (302) are determined so that the oil level (Oa) within the recess portion (304) on the transmission housing (303) is situated above the oil inlet port (323) and below the motor stator (314) and the rotor (13). Therefore, no seal is required between the pump (301) and the electric motor (302). Consequently, the portion of the electric pump unit (306) where the electric pump resides can be made compact in size, and the weight and fabrication costs thereof can be decreased. Since the electric pump (302) operates while the vehicle is stopping, the height of the oil level (Oa) of the hydraulic oil (O) can be controlled only by controlling the amount of the hydraulic oil (O).

When a part of the motor stator (314) is in contact with the transmission housing (303), since the heat capacity of the transmission housing (303) is large, heat generated in the stator (314) is dissipated with good efficiency.

The configurations of the individual constituent portions of the electric pump unit (306) for a transmission are not limited to those described in the embodiment above but can be altered as required.

In the embodiment described above, the lower portion of the motor shaft (312) is supported by a slide bearing made up of the bush (327). However, the lower portion may be supported by a rolling bearing such as a ball bearing as an upper portion of the motor shaft (312) is done.

Thus, as has been described heretofore, the electric pump unit for a transmission according to the embodiments of the invention is the electric pump unit for a transmission which supplies a hydraulic pressure to the transmission and includes the pump which takes in and discharges the oil and the pump driving electric motor. The pump driving electric motor includes, for example, the motor shaft which is connected to the pump, the motor rotor which is fixedly provided on the motor shaft and the motor stator which is disposed around the circumference of the motor rotor. The pump and the electric motor are integrated with the lid which tightly closes the opening in the recess portion which is formed on the transmission housing of the transmission and into which oil is introduced, so as to be accommodated within the recess portion. At least a part of the pump and the electric motor may be soaked in the oil.

Since the pump and the pump driving electric motor are accommodated within the recess portion which is formed on the transmission housing, the unit housing of the conventional electric pump unit is not necessary, and consequently, the waterproofing of the unit housing is also not necessary. Since the controller of the electric motor is not provided within the transmission housing, the waterproofing of the transmission housing is also not necessary. Heat generated in the motor is dissipated from the portion thereof which is soaked in the oil to the transmission housing having the large heat capacity through the oil. Because of this, the size of the portion of the electric pump unit where the electric pump resides does not have to be enlarged for heat dissipation, and therefore, the portion of the electric pump unit where the electric pump resides can be made compact in size, and the weight and fabrication costs thereof can be decreased.

The motor rotor may be such that the plural permanent magnets are fixed to the outer circumferential portion of the cylindrical rotor main body with the appropriate means such as bonding. Preferably, the motor rotor is such that the plural permanent magnets are held by the synthetic resin permanent magnet holding member which is fixedly provided on the outer circumferential portion of the cylindrical rotor main body.

By adopting this configuration, the permanent magnets do not have to be fixed to the rotor main body with an adhesive, and hence, there are no fears that the permanent magnets are separated from the rotor main body.

For example, the outer circumferential surface of the rotor main body is formed into the cylindrical surface, and the detent recessions are formed at both the end portions of the rotor main body in the plural locations defined along the circumferential direction of the outer circumferential portion thereof. The permanent magnet holding member includes the annular portions which are closely attached to the outer circumferential portions of the end faces of the rotor main body and the connecting portions which connect together both the annular portions and hold the permanent magnets on the outer circumferential surface of the rotor main body. The plural detent projections adapted to fit in the corresponding detent recesses on the rotor main body are formed integrally on the permanent magnet holding member.

By adopting this configuration, since the detent projections on the permanent magnet holding member fit in the corresponding detent recesses on the rotor main body, even in the event that the outer circumferential surface of the rotor main body is formed into the cylindrical surface, the permanent magnet holding member never slides relative to the rotor main body in the circumferential direction as a result of rotation, whereby the permanent magnet holding member is fixed in place in an ensured fashion. Since the outer circumferential surface of the rotor main body is formed into the cylindrical surface, the rotor main body can be worked easily, thereby making it possible to fabricate it inexpensively.

The detent recesses formed on the rotor main body are, for example, the notched structures which extend from the outer circumferential portions of the end faces of the rotor main body to the end portions of the outer circumferential surfaces. In this case, the detent projections on the permanent magnet holding member are formed in the surfaces of the annular portions which face each other. The detent recesses may be formed into the bottomed holes which are formed in the plural locations of either of the end faces and the outer circumferential surface of the rotor main body or in the plural locations of both. In either of the cases, the detent projections on the permanent magnet holding member are provided in positions corresponding to the detent recesses on the rotor main body.

For example, the connecting portions of the permanent magnet holding member are made up of the plural rod-shaped portions which extend in the axial direction to connect together both the annular portions. The permanent magnet holding claw portions which project to both the sides in the circumferential direction are formed integrally at the portions of each rod-shaped portion which extend further radially outwards than the annular portions, so that the permanent magnets are held between the claw portions of the adjacent rod-shaped portions.

By adopting this configuration, the weight of the permanent magnet holding member can be decreased, and the permanent magnets can be held by the claw portions in an ensured fashion.

For example, the motor shaft is disposed horizontally and is supported rotatably on the transmission housing or the lid via the bearing (for example, the rolling bearing), and at least the portion of the interior of the recess portion which lies below the center of the motor shaft is soaked in the oil.

When at least the portion of the interior of the recess portion which lies below the center of the motor shaft is soaked in the oil, the rolling bearing which supports the motor shaft is soaked in the oil, whereby the rocking bearing is lubricated by the oil. Because of this, grease for lubricating the rolling bearing and the seal therefor are not necessary to be provided thereon.

For example, the motor stator includes the core, the synthetic resin insulator incorporated in the core, and the coil wound around a portion of the insulator. The insulator is formed integrally with the synthetic resin lid. The threaded holes are formed in the end face of the insulator, and the through holes are formed in the pump housing. The motor stator and the pump housing are combined together into the one unit by the screw members which are passed through the through holes and are then screwed into the threaded holes.

By adopting this configuration, the pump and the electric motor can be integrated with the lid in an ensured fashion, and moreover, the whole of the electric pump unit can be made compact in size.

The pump is the internal gear pump, for example. The internal gear pump includes, for example, the housing (the pump housing) in the interior of which is formed the pump compartment which is defined by the inner circumferential wall and both the axial end walls, the outer gear which has the internal teeth along the inner circumference thereof and the inner gear which is accommodated rotatably inside the outer gear within the pump compartment so that both the end faces are brought into side contact with both the end walls and which has the external teeth which are formed on the outer circumference thereof so as to mesh with the internal teeth of the outer gear. The oil inlet port is formed in the portion on the end wall which corresponds to the predetermined meshing portion of the internal teeth with the external teeth and the oil outlet port is formed in the portion of the end wall which corresponds to the other meshing portion of the internal teeth with the external teeth.

In addition, the oil inlet port in the pump housing may communicate directly with the external portion, and the oil passage through which the oil is introduced from the radially outer side of the pump housing into the oil inlet port may be formed between the pump housing and the motor stator. For example, the following configuration may be adopted. The electric pump unit includes the pump in which the oil inlet port and the oil outlet port, which both communicate with the external portions, are provided in the axial end wall which defines the pump compartment within the pump housing and the pump driving electric motor which has the motor shaft which is connected to the pump, the motor rotor which is fixedly provided on the motor shaft and the motor stator which is disposed around the circumference of the motor rotor. The motor stator is integrated with the lid which tightly closes the opening in the recess portion of the unit housing into which the oil is introduced and is integrated with the pump housing, and the pump and the electric motor are accommodated within the recess. The oil inlet port in the pump housing communicates directly with the external portion, and the oil passage through which the oil is introduced from the radially outer side of the pump housing into the oil inlet port is formed between the pump housing and the motor stator.

For example, the space within the recess portion on the unit housing communicates with the oil supply source such as the external oil pan via the oil inlet hole which is formed in the appropriate location on the unit housing. The oil outlet port does not communicate with the space within the recess portion and communicates with the external portion by the appropriate means such as the oil outlet pipe.

Although the oil is introduced into the recess portion to such an extent that the oil is introduced into the oil inlet port from the oil passage, the oil may be introduced so as to fill the recess portion.

The oil within the recess portion enters the pump compartment from the oil passage defined between the pump housing and the motor stator by way of the oil inlet port and is then discharged to the external portion from the oil outlet port by way of the oil outlet port.

In the electric pump unit according to the embodiments of the invention, the seals are established only between the lid and the unit housing and between the oil outlet pipe and the unit housing, and hence, the waterproofing of the electric pump unit becomes simple. Since the controller of the electric motor is not provided within the unit housing, the waterproofing of the unit housing is not necessary. Heat generated in the motor is dissipated to the unit housing having the large heat capacity from the portion which is soaked in the oil through the oil. Because of this, the size of the portion of the electric pump unit where the pump resides does not have to be enlarged for heat dissipation, and therefore, the electric pump unit can be made compact in size and the weight and fabrication costs thereof can be decreased.

Since the oil inlet port communicates directly with the external portion, any oil inlet hole which establishes a communication between the oil inlet port and the external portion does not have to be formed in the pump housing, whereby the pump housing can be made small accordingly, and the number of fabrication steps can also be decreased. Preferably, the oil inlet port is connected directly to the oil outlet pipe without involving any oil outlet port therebetween. By adopting this configuration, any oil outlet port does not have to be formed in the pump housing, and the pump housing can be made small in size accordingly. The number of fabrication steps is also decreased.

Normally, the motor shaft is supported rotatably by the bearing unit which uses the rolling bearing. When the portion where the bearing unit resides is soaked in the oil, the bearing unit is lubricated by the oil, and hence, grease for lubricating the bearing unit and the seal therefor are not necessary.

When the invention is applied to the electric pump unit for a transmission, the transmission housing is referred to as a unit housing. In this case, since the pump and the pump driving electric motor which make up the electric pump unit are integrated with the lid and are accommodated within the recess portion, the housing of the conventional electric pump unit becomes unnecessary, and the piping with the transmission housing is simplified. Consequently, the waterproofing of the electric pump unit becomes simpler, and the electric pump unit can be made smaller and the weight and fabrication costs thereof can be decreased further.

In addition, the following configuration may be adopted. The seals are established between the lid and the transmission housing and between the pump housing and the transmission housing, and the interior of the recess portion is divided into the opening side space which includes the electric motor and the bottom side space. For example, the electric pump unit for a transmission may be the electric pump unit for a transmission which supplies a hydraulic pressure to the transmission, including the pump having the pump housing in which the oil inlet port and the oil outlet port are provided and the pump driving electric motor and being integrated with the lid which tightly closes the opening in the recess portion which is formed on the transmission housing so as to be accommodated within the recess portion, wherein the electric motor is positioned closer to the lid than the pump, wherein the seals are established between the lid and the transmission housing and between the pump housing and the transmission housing, and wherein the interior of the recess portion is divided into the opening side space which includes the electric motor and the bottom side space. In addition, the oil inlet port and the oil outlet port may be provided in the bottom side space in the pump housing, so that the oil is introduced into the bottom side space.

Since the pump and the pump driving electric motor are accommodated in the recess portion formed on the transmission housing, the unit housing of the conventional electric pump unit is not necessary, and consequently, the portion of the electric pump unit where the electric pump resides can be made smaller in size.

For example, O-rings are used for the seals disposed in the two locations.

Here, when the pump and the pump driving electric motor are incorporated in the transmission housing with a view to making the electric pump unit much smaller, either of a construction in which the electric motor is driven in the oil introduced into the transmission housing with a view to making the electric motor smaller in size and eliminating the seals as a result of adoption of oil cooling and a construction in which the electric motor is driven within a waterproofed space in the transmission housing is adopted.

In the construction in which the electric motor is driven in the oil, there may be a case where the motor efficiency is decreased by oil stirring resistance.

In the construction in which the electric motor is driven in the waterproofed space, a complex sealing and piping to the pump are necessary.

In the configuration described above, the waterproofing of the electric motor can be ensured by the relatively simple seals disposed in the two locations. Since the electric pump unit is designed to introduce the oil into the bottom side space only, a complex piping is not necessary which would otherwise be necessary to allow the oil to be taken into and discharged out of the pump.

For example, the oil inlet hole through which the oil is introduced into the bottom side space is formed in the transmission housing, the oil inlet port is formed in the pump housing so as to face the bottom side space, and the oil outlet pipe is connected to the oil outlet port.

In this case, the oil is introduced into the bottom side space from the oil inlet hole formed in the transmission housing, is taken into the pump from the oil inlet port and is discharged from the oil outlet port through the oil outlet pipe. Because of this, only the oil outlet pipe is necessary as piping to the pump, resulting in an extremely simple construction.

The electric motor includes, for example, the motor shaft connected to the pump, the motor rotor fixedly provided on the motor shaft and the motor rotor disposed around the circumference of the motor rotor. Then, the motor stator is fixed to the lid, and the pump housing is fixed to the motor stator. Preferably, a part of the motor stator is in contact with the pump housing. By adopting this configuration, heat generated in the motor stator is dissipated to the transmission housing having the large heat capacity with good efficiency, thereby making it possible to make the electric motor smaller in size.

The motor rotor is, for example, such that the plural permanent magnets are fixed to the outer circumferential portion of the cylindrical rotor main body by the appropriate means such as bonding. In addition, the motor rotor may be such that the plural permanent magnets are held by the synthetic resin permanent magnet holding member which is fixedly provided on the outer circumferential portion of the cylindrical rotor main body.

The controller of the electric motor may not be provided within the transmission housing or may be provided in the opening side space which is waterproofed.

In addition, the motor stator may be brought into contact with the transmission housing. For example, the electric pump unit for a transmission may be the electric pump unit for a transmission which supplies a hydraulic pressure to the transmission, including the pump having the pump housing in which the oil inlet port and the oil outlet port are provided and the pump driving electric motor having the motor shaft connected to the pump, the motor rotor fixedly provided on the motor shaft and the motor stator disposed around the circumference of the motor rotor and being integrated with the lid which tightly closes the opening in the recess portion which is formed on the transmission housing so as to be accommodated within the recess portion, wherein the electric motor is positioned closer to the lid than the pump, wherein the seals are established between the lid and the transmission housing and between the pump housing and the transmission housing, wherein the interior of the recess portion is divided into the opening side space which includes the electric motor and the bottom side space, wherein the oil inlet port and the oil outlet port are provided in the bottom side space, so that the oil is introduced into the bottom side space and wherein the motor stator is brought into contact with the transmission housing.

Since the pump and the pump driving electric motor are accommodated in the recess portion formed on the transmission housing, the unit housing of the conventional electric pump unit is not necessary, and consequently, the portion of the electric pump unit where the electric pump resides can be made smaller in size.

For example, O-rings are used for the seals disposed in the two locations.

The waterproofing of the electric motor can be ensured by the seals disposed in the two locations. Because of this, the electric motor is free from oil stirring resistance, and the motor efficiency is increased. Therefore, the electric motor can be made smaller in size. In addition, since the motor stator is in contact with the transmission housing, heat generated in the motor stator is dissipated to the transmission housing having the large heat capacity with good efficiency, whereby the electric motor can be made smaller in size. In addition, the electric pump unit is designed to introduce the oil into the bottom side space only, and therefore, a complex piping is not necessary which would otherwise be necessary to allow the oil to be taken into and discharged out of the pump.

For example, the motor stator includes the core, the insulator which is incorporated in the core and the coil wound around a portion of the insulator. The bolt holes are formed in the core portion whose outside diameter is larger than that of the insulator. The bolts are passed through the bolt holes in the lid and the core to be screwed into the transmission housing, whereby the lid and the core are fixed to the transmission housing.

By adopting this configuration, the lid can be fixed to the transmission housing by the bolts, and at the same time, the motor stator can be integrated with the lid. Thus, the contact area between the motor stator and the transmission housing can be increased, so that the heat dissipation efficiency can be increased.

In the electric pump unit for a transmission, the following configuration may be adopted. The interior of the recess portion is divided so that the opening side space constitutes the low pressure space portion and the bottom side space constitutes the high pressure space portion. The oil inlet port is provided in the position which faces the low pressure space portion, and the oil outlet port is provided in the position which faces the high pressure space portion. The oil inlet hole through which the oil is introduced into the low pressure space portion and the oil outlet hole through which the oil is discharged from the high pressure space portion are formed in the transmission housing. For example, the electric pump unit for a transmission may be the electric pump unit for a transmission which supplies a hydraulic pressure to the transmission, including the pump having the pump housing in which the oil inlet port and the oil outlet port are provided and the pump driving electric motor and being integrated with the lid which tightly closes the opening in the recess portion formed on the transmission housing of the transmission so as to be accommodated in the recess portion, wherein the electric motor is positioned closer to the lid than the pump, wherein the seals are established between the lid and the transmission housing and between the pump housing and the transmission housing so that the interior of the recess portion is divided into the opening side low pressure space portion which includes the electric motor and the bottom side high pressure space portion, wherein the oil inlet port which faces the low pressure space portion and the oil outlet port which faces the high pressure space portion are provided in the pump housing, and wherein the oil inlet hole through which the oil is introduced into the low pressure space portion and the oil discharge hole through which the oil is discharged from the high pressure space portion are formed in the transmission housing.

Since the pump and the pump driving electric motor are accommodated in the recess portion formed on the transmission housing, the unit housing of the conventional electric pump unit is not necessary, and therefore, the portion of the electric pump unit where the electric pump resides can be made smaller in size.

For example, O-rings are used for the seals disposed in the two locations.

Here, it is considered to adopt the construction in which the pump housing and the pump driving electric motor which make up the pump are incorporated within the recess portion formed on the transmission housing with a view to making the electric pump unit smaller in size and the oil is introduced into the recess portion so that the electric motor is driven in the oil with a view to making the electric motor smaller in size and eliminating the seals as a result of adoption of oil cooling.

As this occurs, when taking the oil into the pump housing, the oil can be taken in from the oil inlet port which is formed so as to face the interior of the recess portion. However, when discharging the oil, the outlet pipe needs to be connected to the oil outlet port in the pump housing through the transmission housing. Because of this, when incorporating the pump housing in the recess portion, the pump housing needs to be registered with the outlet pipe in phase. This requires phase registration work to be performed between the pump housing and the outlet pipe by use of a positioning pin, and there may be caused a case where the pump housing incorporation work becomes troublesome.

In the configuration described above, the interior of the recess portion can be divided into the low pressure space portion on the oil inlet side and the high pressure space portion on the oil outlet side by the relatively simple seals disposed in the two locations.

The oil is introduced into the low pressure space portion from the oil inlet hole formed in the transmission housing, is then taken into the pump housing from the oil inlet port and is discharged from the oil outlet port through the high pressure space portion and the oil outlet hole formed in the transmission housing. In this way, the interior of the recess portion is divided into the low pressure space portion on the oil inlet side and the high pressure space portion on the oil outlet side, and therefore, no oil outlet pipe has to be laid to be connected to the pump housing, whereby the construction and the pump housing incorporation work become simple.

The electric motor includes, for example, the motor shaft connected to the pump, the motor rotor fixedly provided on the motor shaft and the motor stator disposed around the circumference of the motor rotor. In addition, the motor stator is fixed to the lid, and the pump housing is fixed to the motor stator. Preferably, a part of the motor stator is in contact with the pump housing and/or the lid. By adopting this configuration, heat generated in the motor stator is dissipated to the transmission housing having the large heat capacity with good efficiency, thereby making it possible to make the electric motor smaller in size.

The controller of the electric motor may be provided outside the transmission housing.

In addition, the following configuration may be adopted for the electric pump unit for a transmission. The electric pump unit for a transmission includes the pump which takes in and discharges the oil and the pump driving electric motor having the motor shaft connected to the pump, the motor rotor fixedly provided on the motor shaft and the motor stator disposed around the circumference of the motor rotor and is disposed within the transmission housing which contains transmission oil so that the motor stator is in contact with the transmission housing and a part of the motor stator is soaked in the oil.

Since the pump and the pump driving electric motor are provided within the transmission housing, the unit housing of the conventional electric pump unit is not necessary, and hence, the waterproofing of the unit housing is also not necessary. Since the controller of the electric motor is not provided within the transmission housing, the waterproofing of the transmission housing is not necessary. Since the motor stator is in contact with the transmission housing having the large heat capacity, heat generated in the motor stator is dissipated with good efficiency. Further, heat generated in the motor stator is also dissipated from the portion which is soaked in the oil. Because of this, the size of the electric pump does not have to be enlarged for heat dissipation, and hence, the portion of the electric pump unit where the electric pump resides can be made compact in size, and the weight and fabrication costs can be decreased.

For example, the motor shaft is disposed horizontally, and the lower portion of the motor stator is soaked in the oil.

In addition, the following configuration may be adopted for the electric pump unit for a transmission. The electric pump unit for a transmission includes the pump which takes in and discharges the oil and the pump driving electric motor having the motor shaft connected to the pump, the motor rotor fixedly provided on the motor shaft and the motor stator disposed around the circumference of the motor rotor and is disposed in the transmission housing which contains transmission oil so that the electric motor is situated above the pump and the motor shaft becomes vertical relative to the oil level in the transmission housing, and the positions of the pump and the electric motor are determined so that the oil level is situated above the oil inlet port in the pump and below the motor stator and the motor rotor.

Since the pump and the pump driving electric motor are provided within the transmission housing, the unit housing of the conventional electric pump unit is not necessary, and hence, the waterproofing of the unit housing is also not necessary. Since the controller of the electric motor is not provided within the transmission housing, the waterproofing of the transmission housing is not necessary. The electric pump unit for a transmission is disposed in the transmission housing which contains transmission oil so that the electric motor is situated above the pump and the motor shaft becomes vertical relative to the oil level in the transmission housing, and the positions of the pump and the electric motor are determined so that the oil level is situated above the oil inlet port in the pump and below the motor stator and the motor rotor. Therefore, no seal has to be established between the pump and the electric motor. Consequently, the portion of the electric pump unit where the electric pump resides can be made compact in size, and the weight and fabrication costs can be decreased.

While the invention has been described in detail and by reference to the specific embodiments, it is obvious to a person having ordinary skill in the art that various changes or modifications can be made thereto without departing from the spirit and scope of the invention. For example, in the embodiments that have been described heretofore, one embodiment may be combined with at least one of the other embodiments.

This patent application is based on Japanese Patent Applications (Application Nos. 2009-181325, 2009-181327, and 2009-181319) filed on Aug. 4, 2009, Japanese Patent Applications (Application Nos. 2009-182062, 2009-182057, and 2009-182060) filed on Aug. 5, 2009, and Japanese Patent Applications (Application Nos. 2010-034222 and 2010-034224) filed on Feb. 19, 2010, the contents of which are incorporated herein by reference.

DESCRIPTION OF REFERENCE SIGNS (1), (301) Pump
(2), (302) Electric Motor
(3), (303) Transmission Housing
(4), (304) Recess Portion
(5), (305) Lid
(6), (306) Electric Pump Unit
(7), (307) Pump Housing
(12), (312) Motor Shaft
(13) Motor Rotor
(14), (314) Motor Stator
(17) Core
(18) Insulator
(19) Coil
(20), (320) Bearing Unit
(22) Permanent Magnet
(25) Oil Outlet Port
(26) Oil Outlet Pipe
(27) Oil Inlet Hole
(28) Rotor Main Body
(29) Permanent Magnet Holding Member
(36) O-Ring
(37) O-Ring
(38) Opening Side Space
(39) Bottom Side Space
(40) Oil Inlet Port
(41) Oil Outlet Hole
(126) Oil Inlet Port
(129) Oil Inlet Hole
(217) Bolt
(222) Bolt Hole
(O) Oil
(Oa) Oil Level

The invention claimed is:

1. An electric pump unit for a transmission, which supplies a hydraulic pressure to the transmission, said electric pump unit comprising:
   a pump that comprises a pump housing and takes in and discharges oil; and
   a pump driving electric motor comprising:
      a motor shaft connected to the pump;
      a motor rotor fixedly provided on the motor shaft; and
      a motor stator disposed around a circumference of the motor rotor,
   wherein:
      the pump and the electric motor are integrated with a lid that tightly closes an opening in a recess portion,
      the opening is formed on a transmission housing of the transmission,
      the recess portion defines an inner surface of the transmission housing,
      the oil is introduced into the recess portion such that the oil is stored in the recess portion,
      the pump, with the pump housing, and the electric motor are accommodated within the recess portion,
      the recess portion is formed on an outer surface of the transmission housing and is a bottomed hole having the opening,
      the lid is fixed to the outer surface of the transmission housing around a circumference of the recess portion to tightly close the opening of the recess portion, and
      at least a part of the pump and the electric motor are soaked in the oil stored in the recess portion so that the pump takes in the oil stored in the recess portion.

2. The electric pump unit for the transmission according to claim 1,
   wherein the motor shaft is supported rotatably on the transmission housing or the lid via a bearing, and at least a portion of the motor shaft is soaked in the oil.

3. The electric pump unit for the transmission according to claim 2,
   wherein the pump has an oil inlet port and an oil outlet port which are provided in axial end wall which defines a pump compartment within the pump housing so as to communicate with external portions, respectively, and
   wherein the oil inlet port in the pump housing communicates directly with the external portions, and an oil passage through which the oil is introduced into the oil inlet port from a radially outer side of the pump housing is formed between the pump housing and the motor stator.

4. The electric pump unit for the transmission according to claim 1,
   wherein the motor stator comprises a core, a synthetic resin insulator incorporated in the core, and a coil wound around a portion of the insulator, and
   wherein the insulator is formed integrally with the lid, which is also made of a synthetic resin.

5. The electric pump unit for the transmission according to claim 4,
   wherein a threaded hole is formed in an end face of the insulator, and
   wherein a through hole is formed in the pump housing, and a screw member which is passed through the through hole and is screwed into the threaded hole, whereby the motor stator and the pump housing are integrated into one unit.

6. The electric pump unit for the transmission according to claim 1,
   wherein an oil inlet port and an oil outlet port are provided in the pump housing, and
   wherein seals are established between the lid and the transmission housing and between the pump housing and the transmission housing, so that an interior of the recess portion is divided into an opening side space containing the electric motor and a bottom side space.

7. The electric pump unit for the transmission according to claim 6,
   wherein the oil inlet port and the oil outlet port are provided in the bottom side space in the pump housing, so that the oil is introduced into the bottom side space.

8. The electric pump unit for the transmission according to claim 7,
   wherein an oil inlet hole through which the oil is introduced into the bottom side space is formed in the transmission housing,
   wherein the oil inlet port is formed in the pump housing so as to face the bottom side space, and
   wherein an oil outlet pipe is connected to the oil outlet port.

9. The electric pump unit for the transmission according to claim 6,
   wherein the interior of the recess portion is divided such that the opening side space constitutes a suction pressure space portion and the bottom side space constitutes a discharge pressure space portion, wherein the oil inlet port is provided in a position which faces the suction pressure space portion, and the oil outlet port is provided in a position which faces the discharge pressure space portion, and wherein an oil hole through which the oil is introduced into the suction pressure space portion and an oil hole through which the oil is discharged from the discharge pressure space portion are formed in the transmission housing.

\* \* \* \* \*